United States Patent
Oh et al.

(10) Patent No.: US 11,463,222 B2
(45) Date of Patent: Oct. 4, 2022

(54) METHOD AND DEVICE FOR TRANSMITTING OR RECEIVING UPLINK CONTROL CHANNEL IN WIRELESS COMMUNICATION SYSTEM

(71) Applicant: Samsung Electronics Co., Ltd., Gyeonggi-do (KR)

(72) Inventors: Jinyoung Oh, Seoul (KR); Sungjin Park, Incheon (KR); Jeongho Yeo, Gyeonggi-do (KR); Seunghoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 71 days.

(21) Appl. No.: 16/624,141

(22) PCT Filed: Jun. 20, 2018

(86) PCT No.: PCT/KR2018/006979
§ 371 (c)(1),
(2) Date: Dec. 18, 2019

(87) PCT Pub. No.: WO2018/236152
PCT Pub. Date: Dec. 27, 2018

(65) Prior Publication Data
US 2020/0112416 A1    Apr. 9, 2020

(30) Foreign Application Priority Data
Jun. 23, 2017    (KR) .................. 10-2017-0079926

(51) Int. Cl.
*H04L 5/00* (2006.01)
*H04L 1/16* (2006.01)
(Continued)

(52) U.S. Cl.
CPC .......... *H04L 5/0055* (2013.01); *H04L 1/1685* (2013.01); *H04L 1/1812* (2013.01);
(Continued)

(58) Field of Classification Search
None
See application file for complete search history.

(56) References Cited

U.S. PATENT DOCUMENTS

| 8,923,223 B2 | 12/2014 | Chen et al. |
| 9,210,592 B2 | 12/2015 | Davydov et al. |

(Continued)

FOREIGN PATENT DOCUMENTS

| CN | 106165334 | 11/2016 |
| KR | 1020120030819 | 3/2012 |

(Continued)

OTHER PUBLICATIONS

European Search Report dated May 15, 2020 issued in counterpart application No. 18821153.6-1205, 7 pages.

(Continued)

*Primary Examiner* — Saad Khawar
(74) *Attorney, Agent, or Firm* — The Farrell Law Firm, P.C.

(57) ABSTRACT

A method for transmitting an uplink signal by a terminal in a wireless communication system according to the present invention comprises the steps of: receiving a downlink signal from a base station; receiving downlink control information (DCI) for requesting transmission of an uplink signal corresponding to the downlink signal, from the base station; and transmitting, to the base station, a response to the downlink signal on the basis of a message, wherein the DCI includes at least one among an ACK window field, a DAI field, and an ACK request field for requesting the response to the downlink signal.

15 Claims, 14 Drawing Sheets

(51) Int. Cl.
*H04L 1/18* (2006.01)
*H04W 72/12* (2009.01)

(52) U.S. Cl.
CPC ....... *H04L 5/0007* (2013.01); *H04W 72/1268* (2013.01); *H04W 72/1289* (2013.01)

(56) References Cited

U.S. PATENT DOCUMENTS

| | | | |
|---|---|---|---|
| 10,034,281 | B2 | 7/2018 | Lee et al. |
| 11,265,928 | B2 | 3/2022 | Kim et al. |
| 2014/0003303 | A1 | 1/2014 | Yang et al. |
| 2015/0215079 | A1 | 7/2015 | Park |
| 2016/0099799 | A1* | 4/2016 | Bashar ................. H04L 1/1893 370/280 |
| 2016/0212734 | A1 | 7/2016 | He et al. |
| 2016/0218832 | A1* | 7/2016 | Dabeer ............... H04L 43/0847 |
| 2016/0261379 | A1 | 9/2016 | Bergstrom et al. |
| 2016/0330721 | A1 | 11/2016 | Park et al. |
| 2017/0027002 | A1 | 1/2017 | Yerramalli et al. |
| 2017/0134140 | A1 | 5/2017 | Park |
| 2018/0006791 | A1 | 1/2018 | Marinier |
| 2018/0241511 | A1* | 8/2018 | Harada ............. H04W 74/0833 |
| 2019/0159251 | A1* | 5/2019 | Li ............................ H04L 1/18 |
| 2020/0213997 | A1* | 7/2020 | Lu ....................... H04W 72/042 |

FOREIGN PATENT DOCUMENTS

| | | |
|---|---|---|
| KR | 1020130062337 | 6/2013 |
| KR | 1020130105882 | 9/2013 |
| KR | 1020140010098 | 1/2014 |
| WO | WO 2016/123372 | 8/2016 |
| WO | WO 2016/182366 | 11/2016 |

OTHER PUBLICATIONS

PCT/ISA/210 Search Report issued on PCT/KR2018/006979, pp. 6.
PCT/ISA/237 Written Opinion issued on PCT/KR2018/006979, pp. 10.
Chinese Office Action dated Dec. 30, 2021 issued in counterpart application No. 201880052552.3, 14 pages.
Korean Office Action dated Jan. 6, 2022 issued in counterpart application No. 10-2017-0079926, 8 pages.

* cited by examiner

METHOD AND DEVICE FOR TRANSMITTING OR RECEIVING UPLINK CONTROL CHANNEL IN WIRELESS COMMUNICATION SYSTEM

PRIORITY

This application is a National Phase Entry of PCT International Application No. PCT/KR2018/006979 which was filed on Jun. 20, 2018, and claims priority to Korean Patent Application No. 10-2017-0079926, which was filed on Jun. 23, 2017, the content of each of which is incorporated herein by reference.

TECHNICAL FIELD

The disclosure relates to a method and apparatus for transmitting or receiving an uplink control channel in a wireless communication system. Particularly, the disclosure relates to a method of transmitting or retransmitting an uplink control channel if a terminal fails to transmit the uplink control channel at a scheduled time or needs to perform retransmission.

BACKGROUND ART

In order to meet wireless data traffic demands that have increased since commercialization of the 4G communication system, efforts to develop an improved 5G communication system or a pre-5G communication system have been made. For this reason, the 5G communication system or the pre-5G communication system is called a beyond 4G network communication system or a post-LTE system.

In order to achieve a high data transmission rate, implementation of the 5G communication system in an ultra-high frequency (mmWave) band (e.g., 60 GHz band) is being considered. In the 5G communication system, technologies such as beamforming, massive MIMO, full dimensional MIMO (FD-MIMO), array antenna, analog beamforming, and large scale antenna are being discussed as means to mitigate a propagation path loss in the ultra-high band and increase a propagation transmission distance.

Further, in the 5G communication system, technologies, such as an evolved small cell, an advanced small cell, a cloud radio access network (cloud RAN), an ultra-dense network, device-to-device communication (D2D), a wireless backhaul, a moving network, cooperative communication, coordinated multi-points (CoMP), and received interference cancellation, are being developed in order to improve the system network. In addition, in the 5G system, advanced coding modulation (ACM) schemes, such as hybrid FSK and QAM modulation (FQAM) and sliding window super-position coding (SWSC), and advanced access technologies, such as filter bank multi carrier (FBMC), non orthogonal multiple access (NOMA), and sparse code multiple access (SCMA), are being developed.

Meanwhile, the Internet has been evolved from a human-oriented connection network in which humans generate and consume information, to an Internet of Things (IoT) network in which distributed components such as objects exchange and process information. An Internet of Everything (IoE) technology in which a big data processing technology via a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, via collection and analysis of data generated in connected objects, an intelligent Internet technology (IT) service to create a new value for peoples' lives may be provided. The IoT may be applied to fields such as those of a smart home, a smart building, a smart city, a smart car, a connected car, a smart grid, health care, a smart home appliance, or high-tech medical services via the convergence of the conventional Information technology (IT) and various industries.

Accordingly, various attempts to apply the 5G communication to the IoT network are being made. For example, technologies such as a sensor network, machine-to-machine (M2M) communication, and machine type communication (MTC) are implemented by beamforming, MIMO, and array antenna schemes of the 5G communication technology. The application of a cloud RAN as the big data processing technology may be an example of convergence of the 5G technology and the IoT technology.

The 5G system considers supporting more various services compared to the legacy 4G system. Representative services may be, for example, an enhanced mobile broad band (eMBB) service, an ultra-reliable and low latency communication (URLLC) service, a massive machine type communication (mMTC) service, an evolved multimedia broadcast/multicast service (eMBMS), and the like. A system that provides the URLLC service may be referred to as a URLLC system. A system that provides the eMBB service may be referred to as an eMBB system. Also, terms, a "service" and a "system" may be interchangeably used.

In a communication system, a plurality of services may be provided to a user. In order to provide a plurality of services to a user, there is a desire for a method and an apparatus for providing services according to respective characteristics within the same time interval.

In a wireless communication system, for example, the LTE or LTE-A system, a base station may transmit downlink control information (DCI) including uplink resource allocation information to a terminal via a downlink control channel (physical downlink control channel (PDCCH)), so as to configure at least one uplink transmission for the terminal from among uplink control information (e.g., sounding reference signal (SRS) or uplink control information (UCI), or physical random access channel (PRACH)) or an uplink data channel (physical uplink shared channel (PUSCH)). For example, a terminal that receives uplink transmission configuration information (or uplink DCI) transmitted from a base station via a PDCCH, in subframe n, may perform uplink data channel transmission (hereinafter, PUSCH transmission) at a time defined in advance (e.g., n+4) or according to transmission time configuration information included in the uplink transmission configuration information.

In this instance, if the configured uplink transmission is performed with respect to an unlicensed band or a cell or a base station that operates in an unlicensed band, the terminal performs a channel access procedure (or listen-before talk (LBT)) with respect to the unlicensed band in which the uplink transmission is configured, before or immediately before the start point of the configured uplink transmission, and may perform the configured uplink signal transmission when it is determined that the unlicensed band is in the idle state. If it is determined that the unlicensed band is not in the idle state via the channel access procedure performed by the terminal, the terminal may not perform the configured uplink signal transmission. In the channel access procedure with respect to the unlicensed band in which the uplink transmission is configured, the terminal compares the intensity of a signal received during a predetermined period of time with a threshold value defined in advance or configured by the base station, and determines whether the unlicensed band is in the idle state. For example, if the intensity of the signal received during 25 us is less than −72 dBm, which is a threshold value defined in advance, the terminal may determine that the unlicensed band is in the idle state, and may perform the configured uplink transmission. If the intensity of the signal received during 25 us is greater than −72 dBm, which is a threshold value defined in advance, the terminal determines that the unlicensed band is not in the idle state and does not perform the configured uplink transmission.

Therefore, in the case in which the result of the channel access procedure shows that the unlicensed band in which the uplink transmission is configured is not in the idle state, in the case in which another uplink signal transmission is configured to be started at the start point of the configured uplink transmission, in the case in which a signal for performing control so as not to transmit an uplink signal at a predetermined time (slot or symbol) is received from a base station, and the uplink signal transmission at the start point of the configured uplink transmission is not performed, or in the case in which additional uplink signal transmission needs to be performed in order to secure reception performance or coverage, if uplink signal transmission is performed via an additional uplink transmission resource, which is different from the configured uplink transmission resource, the uplink transmission performance and the entire system performance of the terminal may be improved. To this end, at least a method in which one or more uplink signal transmission resources are additionally configured for a terminal by a base station, and the terminal transmits an uplink signal using at least one of the configured uplink transmission resources, or a method in which a terminal is reconfigured by a base station so as to perform uplink signal transmission including an uplink signal of which transmission fails when the terminal fails to transmit an uplink signal at the start point of the configured uplink transmission, may be needed.

DISCLOSURE OF INVENTION

Technical Problem

Therefore, the disclosure has been made in view of the above-mentioned problems, and an aspect of the disclosure is to provide a method in which one or more transmission resources for uplink signal transmission is configured for a terminal by a base station, or a terminal is reconfigured so as to perform uplink signal transmission, and the terminal transmits an uplink signal using at least one of the configured uplink transmission resources.

Solution to Problem

According to an embodiment of the disclosure, a method of a terminal may include: receiving a downlink signal from a base station; receiving, from the base station, downlink control information (DCI) that requests uplink signal transmission in response to the downlink signal; and transmitting, based on the message, a response to the downlink signal to the base station.

According to an embodiment of the disclosure, the DCI may include at least one of an acknowledgement (ACK) request field, a downlink assignment index (DAI) field, and an ACK window field, in order to request a response to the downlink signal.

According to an embodiment of the disclosure, the response to the downlink signal may include reception results associated with one or more hybrid automatic repeat request (HARQ) processes determined by the DCI.

According to an embodiment of the disclosure, when the DCI includes an uplink grant, the response to the downlink signal is transmitted via an uplink data channel indicated by the DCI, and when the DCI includes a downlink grant, the response to the downlink signal is transmitted via an uplink control channel indicated by the DCI.

According to an embodiment of the disclosure, a terminal may include: a transceiver configured to transmit and receive a signal; and a controller configured to receive a downlink signal from a base station, to receive downlink control information (DCI) that requests uplink signal transmission in response to the downlink signal from the base station, and to transmit, based on the message, a response to the downlink signal to the base station.

According to an embodiment of the disclosure, a method of a base station may include: transmitting a downlink signal to a terminal; transmitting, to the terminal, downlink control information (DCI) that requests uplink signal transmission in response to the downlink signal; and receiving, based on the message, a response to the downlink signal from the terminal.

According to an embodiment of the disclosure, a base station may include: a transceiver configured to transmit and receive a signal; and a controller configured to transmit a downlink signal to a terminal, to transmit, to the terminal, downlink control information (DCI) that requests uplink signal transmission in response to the downlink signal, and to receive, based on the message, a response to the downlink signal from the terminal.

Advantageous Effects of Invention

According to an embodiment of the disclosure, one or more transmission resources for uplink signal transmission are configured for a terminal by a base station, or a terminal is reconfigured so as to perform uplink signal transmission, and thus, there is provided a method of performing control signal decoding and transmission or reception related thereto in the delay reduce mode of the base station and the terminal, and resources may be effectively managed.

MODE FOR THE INVENTION

Figure 1:
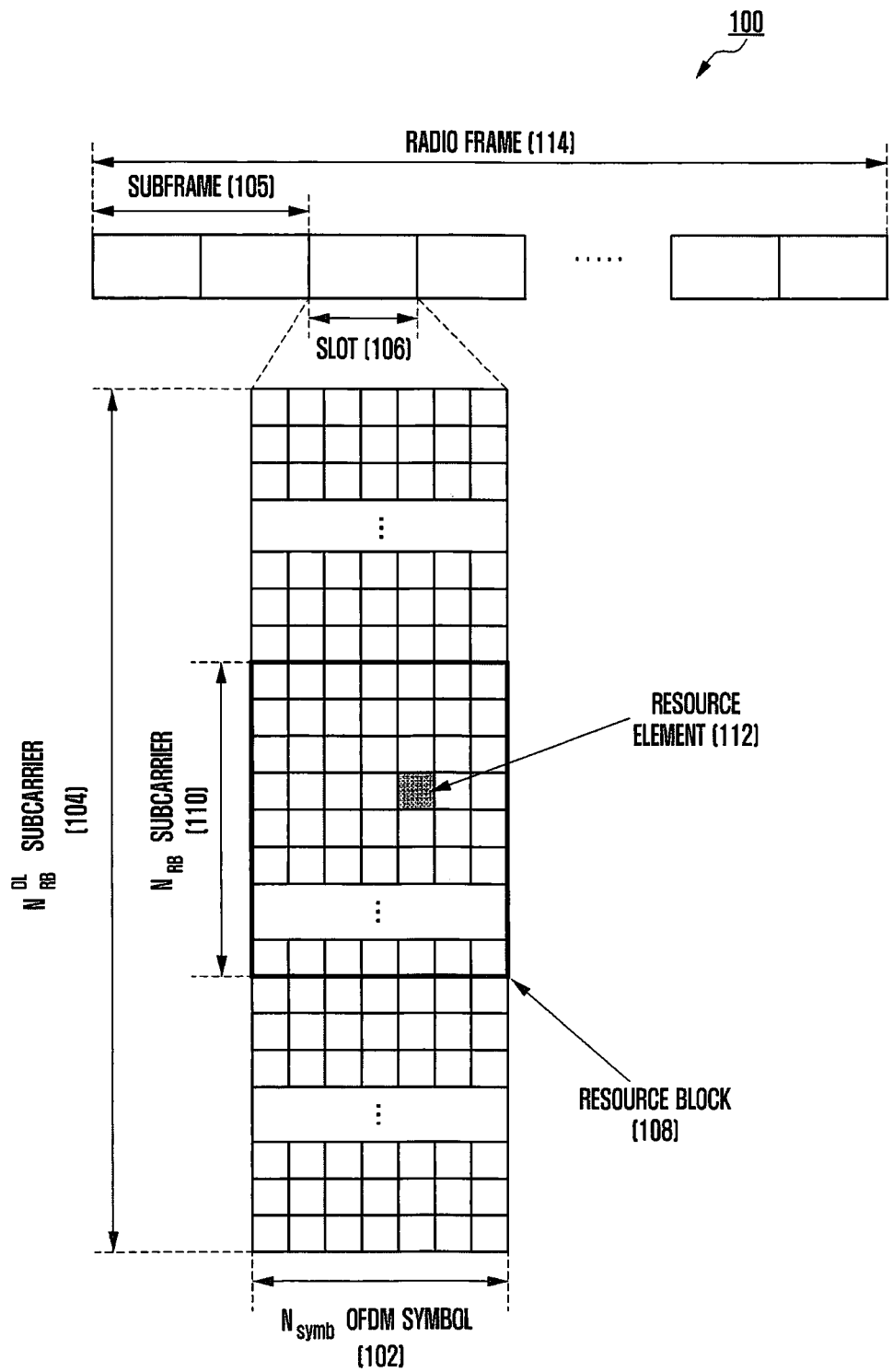
FIG. 1 is a diagram illustrating the structure of a time-frequency domain for downlink transmission in an LTE or LTE-A system.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, the '~unit' may include one or more processors.

A wireless communication system has developed to be a broadband wireless communication system that provides a high-speed and high-quality packet data service, like the communication standards, for example, high speed packet access (HSPA) of 3GPP, long term evolution (LTE) or evolved universal terrestrial radio access (E-UTRA), LTE-advanced (LTE-A), high rate packet data (HRPD) of 3GPP2, ultra mobile broadband (UMB), and 802.16e of IEEE, or the like, beyond the voice-based service provided at the initial stage. Also, communication standard of 5G or new radio (NR) is being developed as a 5G wireless communication system.

In the wireless communication system including 5G, at least one service from among enhanced mobile broadband (eMBB), massive machine type communications (mMTC) and ultra-reliable and low-latency communications (URLLC) may be provided to a terminal. The services may be provided to the same terminal during the same time interval. In an embodiment, eMBB may be a service for high-speed transmission of high-capacity data. mMTC may be a service for minimizing the power of a terminal, and for supporting multiple terminal access. URLLC may be a service for high reliability and low latency. However, the disclosure is not limited thereto. The three services are the main scenarios in the LTE system or a post-LTE system, such as 5G/NR (new radio or next radio) or the like. In an embodiment, a method of coexistence between eMBB and URLLC, or between mMTC and URLLC, and an apparatus using the same will be described.

In the case in which a base station schedules data corresponding to the eMBB service for a terminal in a predetermined transmission time interval (TTI), if URLLC data transmission in the corresponding TTI is required, a part of the eMBB data is not transmitted in the frequency band in which the eMBB data is already scheduled and transmitted, and the URLLC data is transmitted in the frequency band. A terminal for which eMBB is scheduled and a terminal for which URLLC is scheduled may be the same as or different from each other. In this instance, some of the eMBB data, which was scheduled and transmitted, may not be transmitted, and thus, there is high probability of loss of eMBB data. Therefore, there is a desire for a method of processing a received signal by a terminal for which eMBB is scheduled or a terminal for which URLLC is scheduled, and a method of receiving a signal. According to an embodiment, provided is a description of a coexistence method between different services so as to transmit information of each service, when information based on eMBB and information based on URLLC are scheduled by coexisting a part or the entire frequency band, when information based on mMTC and information based on URLLC are scheduled in parallel, when information based on mMTC and information based on eMBB are scheduled in parallel, or when information based on eMBB, information based on URLLC, and information based on mMTC are scheduled in parallel.

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification. Hereinafter, a base station is a subject of performing resource allocation with respect to a terminal, and may be at least one of an eNodeB, a NodeB, a base station (BS), a wireless access unit, a base station controller, or a node on a network. A terminal may include a user equipment (UE), a mobile station (MS), a cellular phone, a smart phone, a computer, or a multimedia system capable of performing a communication function. In the disclosure, a downlink (DL) is a wireless transmission path of a signal that a base station transmits to a terminal. An uplink (UL) is a wireless transmission path of a signal that a terminal transmits to a base station. Also, although an embodiment of the disclosure is described with reference to an LTE or LTE-A system, the embodiment of the disclosure may be applicable to other communication systems having a similar technical background or a similar channel. For example, the 5G mobile communication technology (5G, new ratio, or NR) developed after LTE-A may be included. Also, an embodiment of the disclosure may be modified by those skilled in the art without departing from the scope of the disclosure, and may be applied to other communication systems.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). The uplink indicates a wireless link via which a terminal (a terminal or user equipment (UE)) or a mobile station (MS) transmits data or a control signal to a base station (an eNode B or base station). The downlink indicates a wireless link via which a base station transmits data or a control signal to a terminal. In the multiple access schemes as described above, time-frequency resources for carrying data or control information are allocated and operated in a manner to prevent overlapping of the resources, that is, to establish the orthogonality, between users, so as to identify data or control information of each user.

The LTE system employs a hybrid automatic repeat reQuest (HARQ) scheme that retransmits corresponding data in a physical layer when decoding fails at the initial transmission. The HARQ scheme refers to a scheme that enables a receiver to transmit, to a transmitter, information (negative acknowledgement (NACK)) indicating the failure of decoding when the receiver does not successfully decode data, so that the transmitter retransmits the corresponding data in a physical layer. The receiver may combine data retransmitted from the transmitter and the previous data, decoding of which fails, whereby data reception performance may increase. Also, when the receiver accurately decodes data, the receiver transmits information (ACK) reporting that decoding is successfully executed, so that the transmitter transmits new data.

FIG. 1 is a diagram illustrating the basic structure 100 of a time-frequency domain which is a radio resource area via which data or a control channel is transmitted in a downlink in an LTE system or a system similar thereto.

Referring to FIG. 1, the horizontal axis indicates the time domain. The vertical axis indicates the frequency domain. In the time domain, the minimum transmission unit is an OFDM symbol. One slot 106 includes $N_{symb}$ OFDM symbols 102, and one subframe 105 includes two slots. The length of one slot is 0.5 ms, and the length of one subframe is 1.0 ms. A radio frame 114 is a time domain section including 10 subframes. In the frequency domain, the minimum transmission unit is a subcarrier. The entire system transmission bandwidth may include a total of $N_{BW}$ subcarriers 104. In this instance, a detailed numeral value may be variable.

In the time-frequency domain, the basic resource unit is a resource element (RE) 112, and an RE is expressed by an OFDM symbol index and a subcarrier index. A resource block (RB) (or physical resource block (PRB)) 108 is defined by $N_{symb}$ consecutive OFDM symbols 102 in the time domain and $N_{RB}$ consecutive subcarriers 110 in the frequency domain. Therefore, in one slot, a single RB 108 may include $N_{symb} \times N_{RB}$ REs 112. Normally, the minimum allocation unit for data in the frequency domain is the RB 108. In the LTE system, $N_{symb}=7$ and $N_{RB}=12$, $N_{BW}$ and $N_{RB}$ may be proportional to the bandwidth of a system transmission band. The data rate may increase in proportion to the number of RBs scheduled for a terminal. The LTE system may define and operate 6 transmission bandwidths. In the case of an FDD system that operates a downlink and an uplink on the basis of a frequency, a downlink transmission bandwidth and an uplink transmission bandwidth may be different from each other. A channel bandwidth may indicate an RF bandwidth corresponding to a system transmission bandwidth. Table 1 provided below indicates a relationship between a system transmission bandwidth and a channel bandwidth defined in the LTE system. For example, in the LTE system having a channel bandwidth of 10 MHz, a transmission bandwidth may include 50 RBs.

[Table 1]

Downlink control information may be transmitted within first N OFDM symbols included in the subframe. According to embodiments, generally, N={1, 2, 3}, and may be variable depending on the amount of control information to be transmitted in the current subframe. The transmitted control information may include a control channel transmission interval indicator indicating how many OFDM symbols are used when the control information is transmitted, scheduling information associated with downlink data or uplink data, and information associated with a HARQ ACK/NACK.

In the LTE system, the scheduling information associated with the downlink data or uplink data may be transmitted from a base station to a terminal via downlink control information (DCI). DCI is defined according to various formats. Depending on each format, the DCI indicates whether scheduling information is scheduling information (UL grant) for uplink data or scheduling information (DL grant) for downlink data, whether the size of control information is small and compact DCI, whether spatial multiplexing using multiple antennas is applied, whether DCI is for the purpose of power control, or the like. For example, DCI format 1 which is the scheduling control information (DL grant) for downlink data may include at least one of the following pieces of control information.

Resource allocation type 0/1 flag: indicates whether a resource allocation scheme is type 0 or type 1. Type 0 applies a bitmap scheme and allocates resources in units of resource block groups (RBGs). In the LTE system, a basic scheduling unit is a resource block (RB) expressed by time and frequency domain resources, and an RBG includes a plurality of RBs and is used as a basic scheduling unit in the type 0 scheme. Type 1 allows allocation of a predetermined RB in an RBG.

Resource block assignment: indicates an RB allocated for data transmission. An expressed resource is determined according to the system bandwidth and resource allocation scheme.

Modulation and coding scheme (MCS): indicates a modulation scheme used for data transmission and the size of a transport block, which is data to be transmitted.

HARQ process number: indicates the process number of HARQ.

New data indicator: indicates whether it is HARQ initial transmission or retransmission.

Redundancy version: indicates the redundancy version of a HARQ.

Transmit power control (TPC) command for physical uplink control channel (PUCCH): indicates a transmission power control command for a PUCCH which is an uplink control channel.

The DCI may pass through a channel coding and modulation process, and may be transmitted via a physical downlink control channel (PDCCH) (or control information, hereinafter, they are interchangeably used) or an enhanced PDCCH (EPDCCH) (or improved control information, hereinafter, they are interchangeably used) which is a physical control channel.

Generally, the DCI is scrambled with a predetermined radio network temporary identifier (RNTI) (or a terminal identifier), independently for each terminal, a cyclic redundancy check (CRC) is added, and channel coding is performed, whereby each independent PDCCH is configured and transmitted. In the time domain, a PDCCH is mapped and transmitted during the control channel transmission interval. The location where a PDCCH is mapped in the frequency domain, may be determined based on the identifier (ID) of each terminal, and may be transmitted over the entire system transmission band.

Downlink data may be transmitted via a physical downlink shared channel (PDSCH) which is a physical channel for downlink data transmission. The PDSCH may be transmitted after the control channel transmission interval. The scheduling information such as a detailed mapping location in the frequency domain, a modulation scheme, and the like may be determined based on DCI transmitted via the PDCCH.

Via an MCS in the control information included in the DCI, a base station may report the modulation scheme applied to a PDSCH to be transmitted to a terminal, and the size (transport block size (TBS)) of data to be transmitted. In an embodiment, the MCS may include 5 bits, or may include more or fewer bits than 5 bits. The TBS corresponds to the size of data (transport block (TB)) that the base station desires to transmit, before channel coding for error correction is applied to the data.

The modulation scheme supported by the LTE system includes quadrature phase shift keying (QPSK), 16 quadrature amplitude modulation (16QAM), and 64QAM. Modulation orders ($Q_m$) correspond to 2, 4, and 6 respectively. That is, in the case of the QPSK modulation, 2 bits are transmitted per symbol. In the case of the 16QAM modulation, 4 bits are transmitted per symbol. In the case of 64QAM modulation, 6 bits are transmitted per symbol. Also, a modulation scheme beyond 256QAM may be used according to system deformation.

Figure 2:
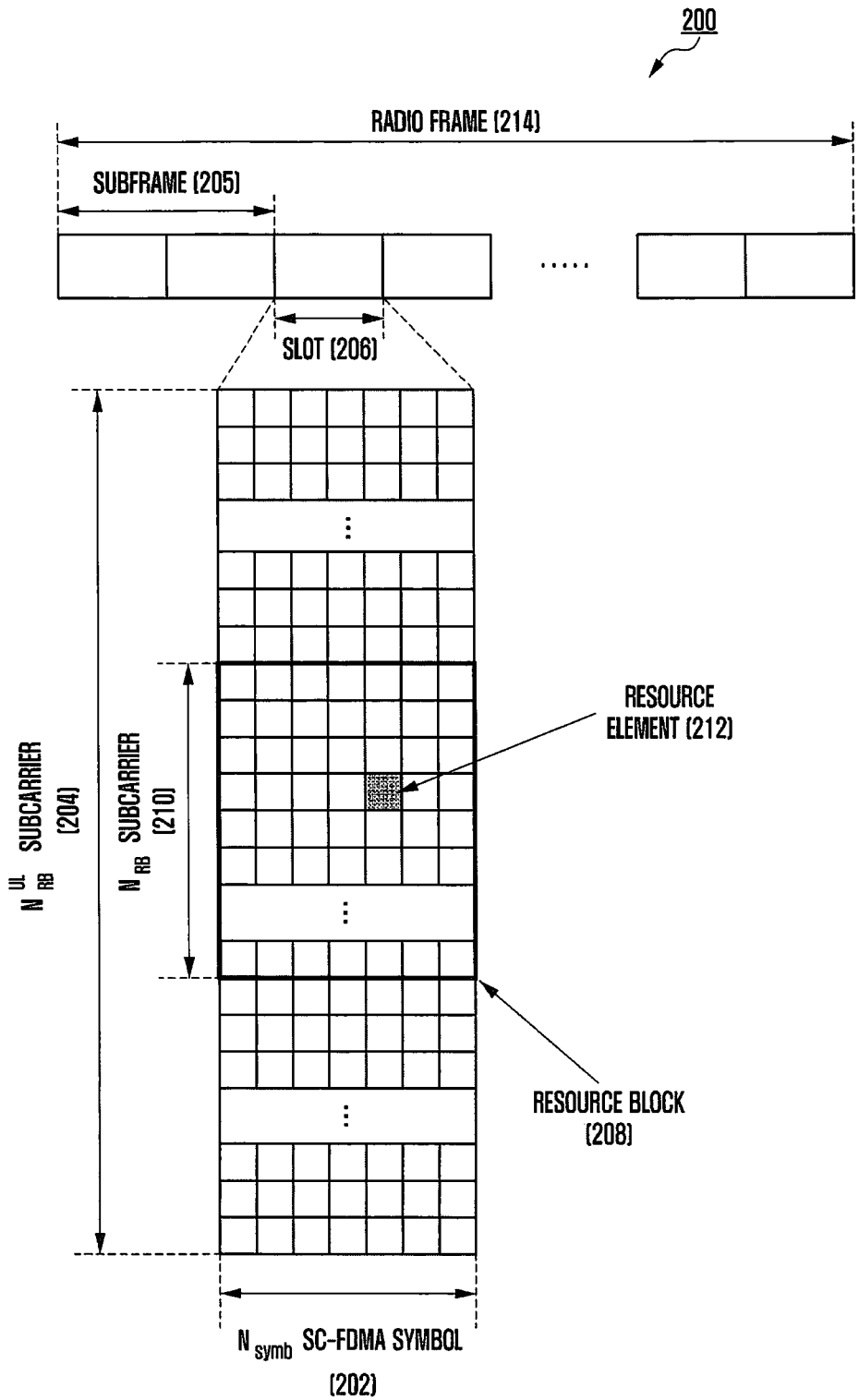
FIG. 2 is a diagram illustrating the structure of a time-frequency domain for uplink transmission in an LTE or LTE-A system.

FIG. 2 is a diagram illustrating the basic structure 200 of a time-frequency domain which is a radio resource area via which data or a control channel is transmitted in an uplink in an LTE system or a system similar thereto.

In FIG. 2, the horizontal axis indicates the time domain and the vertical axis indicates the frequency domain. The minimum transmission unit in the time domain is an SC-FDMA symbol 202, and a single slot 206 may include $N_{symb}^{UL}$ SC-FDMA symbols. A single subframe 205 includes two slots. The minimum transmission unit in the frequency domain is a subcarrier and the entire system transmission band 204 includes a total of $N_{BW}$ subcarriers. $N_{BW}$ may have a value that is proportional to a system transmission band.

In the time-frequency domain, the basic resource unit is a resource element (RE) 212, and an RE is defined by an SC-FDMA symbol index and a subcarrier index. A resource block pair (RB pair) 208 may be defined by $N_{symb}^{UL}$ consecutive SC-FDMA symbols in the time domain and $N_{sc}^{RB}$ consecutive subcarriers in the frequency domain. Accordingly, a single RB includes $N_{symb}^{DL} \times N_{sc}^{RB}$ REs. Generally, the minimum transmission unit of data or control information is an RB. A PUCCH is mapped to a frequency domain corresponding to 1 RB, and may be transmitted during one subframe.

In the LTE system, the timing relationship may be defined between a PDSCH which is a downlink data transmission physical channel or a PDCCH/EPDCCH including a semi-persistent scheduling release (SPS release) and a PUCCH or a PUSCH which is an uplink physical channel that delivers a HARQ ACK/NACK in response thereto. For example, in the LTE system operating according to frequency division duplex (FDD), a HARQ ACK/NACK with respect to a PDCCH/EPDDCH including SPS release or a PDSCH transmitted in subframe (n-4) is transmitted via a PUCCH or a PUSCH in subframe n. In the LTE system, a downlink HARQ adapts an asynchronous HARQ scheme in which a point in time for data retransmission is not fixed. That is, when a base station receives a HARQ NACK from a terminal as a feedback for initial transmission data that the base station transmits, the base station freely determines a point in time for retransmission data via a scheduling operation. For the HARQ operation, the terminal performs buffering of data, which is determined to have an error according to the result of decoding reception data, and may combine the buffered data and the data retransmitted from the base station.

HARQ ACK/NACK information of a PDSCH transmitted in subframe n-k may be transmitted from a terminal to a base station via a PUCCH or a PUSCH in subframe n. In this instance, k is defined differently according to FDD or time division duplex (TDD) of the LTE system, and a subframe configuration thereof. For example, in the case of the FDD LTE system, k is fixed to 4. In the case of the TDD LTE system, k may be changed according to a subframe configuration and a subframe number. Also, in the case of data transmission via a plurality of carriers, k to be applied may vary depending on the TDD configuration of each carrier. In the case of TDD, k is determined based on a TDD UL/DL configuration as shown in Table 2.

TABLE 2

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the LTE system, unlike a downlink HARQ, an uplink HARQ adapts a synchronous HARQ scheme in which a point in time for data transmission is fixed. That is, the uplink/downlink timing relation of a physical uplink shared channel (PUSCH), which is a physical channel for uplink data transmission, a PDCCH which is a downlink control channel preceding the PUSCH, and a physical hybrid indicator channel (PHICH) which is a physical channel for transmission of a HARQ ACK/NACK with respect to the PUSCH, is transmitted or received according to the rule as follows.

When receiving a PHICH for transmission of a downlink HARQ ACK/NACK or a PDCCH including uplink scheduling control information transmitted from a base station in subframe n, a terminal transmits uplink data corresponding to the control information via a PUSCH in sub-frame (n+k). In this instance, k is defined differently according to FDD or TDD of the LTE system, and a configuration thereof. For example, in the case of the FDD LTE system, k is fixed to 4. In the case of the TDD LTE system, k may be changed according to a subframe configuration and a subframe number. Also, in the case of data transmission via a plurality of carriers, k to be applied may vary depending on the TDD configuration of each carrier. In the case of TDD, k is determined based on a TDD UL/DL configuration as shown in Table 3.

TABLE 3

| TDD UL/DL | subframe index n | | | | | | | | | |
|---|---|---|---|---|---|---|---|---|---|---|
| Configuration | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | 4 | 4 | |
| 4 | | | | | | | | | 4 | 4 |
| 5 | | | | | | | | | 4 | |
| 6 | 7 | 7 | | | | 7 | 7 | | | 5 |

HARQ-ACK information of the PHICH transmitted in subframe i is associated with a PUSCH transmitted in subframe i-k. In the case of the FDD system, k is given as 4. That is, in the FDD system, HARQ-ACK information of the PHICH transmitted in subframe i is associated with a PUSCH transmitted in subframe i-4. In the case of the TDD, if a single serving cell is configured or the same TDD UL/DL configuration is configured for a terminal for which EIMTA is not configured, k is given according to Table 4 in the case of TDD UL/DC configuration 0 to 6.

TABLE 4

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

That is, for example, in TDD UL/DL configuration 1, a PHICH transmitted in subframe 6 may be HARQ-ACK information with respect to a PUSCH transmitted in subframe 2 which is four subframes ahead of subframe 6.

In TDD UL/DL configuration 0, if a HARQ-ACK is received via a PHICH resource corresponding to $I_{PHICH}=0$, a PUSCH indicated by the HARQ-ACK information is transmitted in subframe i-k, and k is given according to Table 4. In TDD UL/DL configuration 0, if a HARQ-ACK is received via a PHICH resource corresponding to $I_{PHICH}=1$, a PUSCH indicated by the HARQ-ACK information is transmitted in subframe i-6.

In the case of an LTE system that performs downlink or uplink communication in an unlicensed band (hereinafter, licensed-assisted access (LAA) system), a base station or a terminal may need to determine whether the unlicensed band to be used for communication is in the idle state before transmitting a downlink or uplink signal. For example, if the size of a reception signal received in the unlicensed band during a predetermined period of time is smaller than a predetermined threshold value, the base station or the terminal may transmit a signal in the unlicensed band. Therefore, in order to transmit an uplink signal in an LAA system, a base station may determine whether an unlicensed band is in the idle state, and when it is determined that the unlicensed band is in the idle state, the base station may transmit a PDCCH including uplink scheduling control information to be used for configuring uplink data transmission of a terminal.

Although the description about the wireless communication system has been provided with reference to an LTE system, the disclosure is not limited to the LTE system and may be applicable to various wireless communication systems such as NR, 5G, or the like. Also, if the embodiment is applied to wireless communication systems other than LTE, k may be changed and applied to a system that uses a modulation scheme corresponding to FDD.

Figure 3:
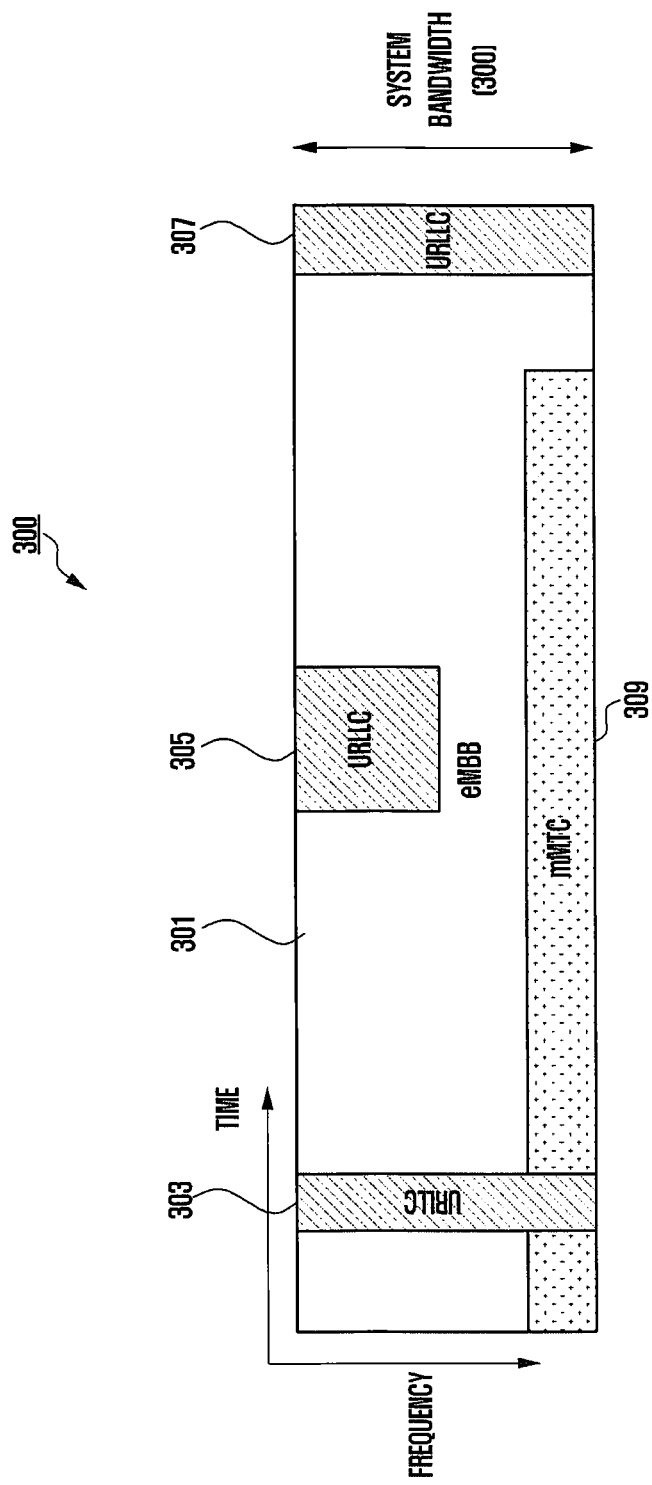
FIG. 3 is a diagram illustrating that data for eMBB, URLLC, and mMTC are allocated in a frequency-time domain in a communication system.
Figure 4:
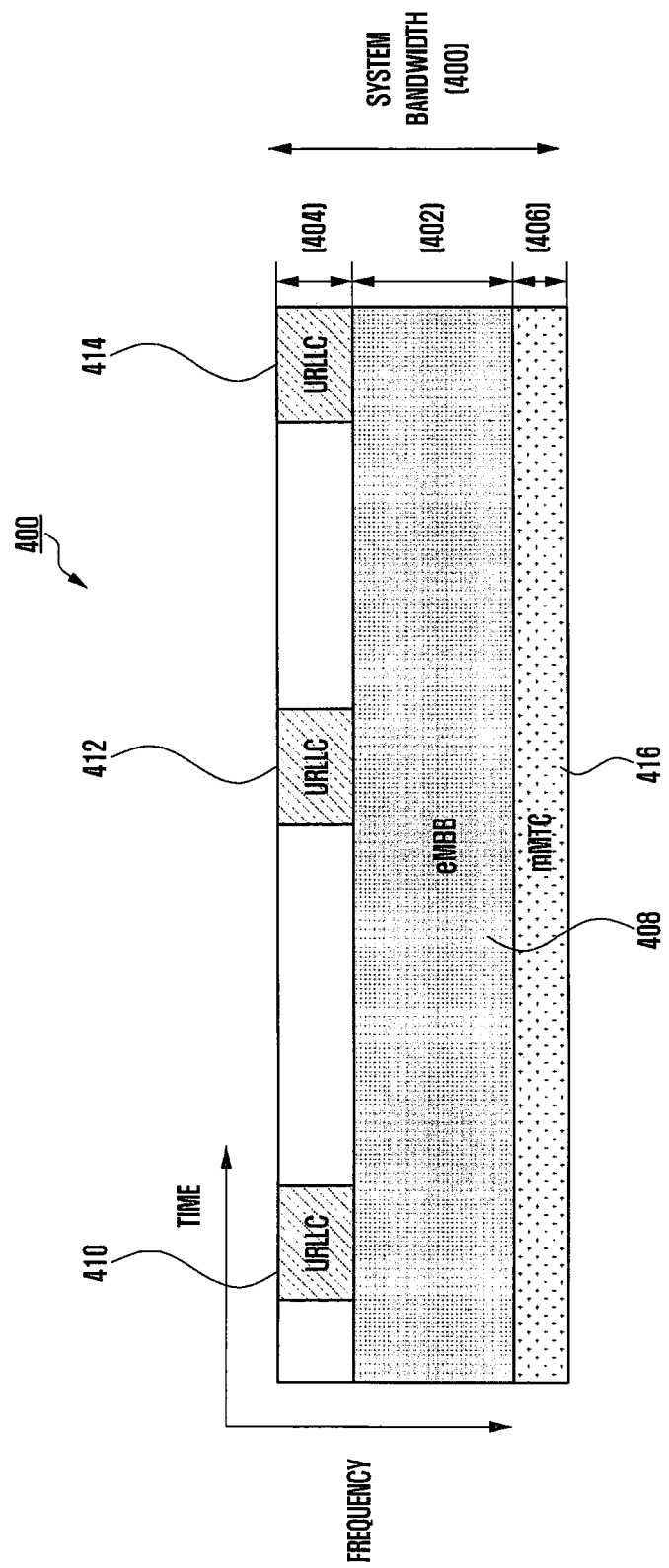
FIG. 4 is a diagram illustrating that data for eMBB, URLLC, and mMTC are allocated in a frequency-time domain in a communication system.

FIGS. 3 and 4 are diagrams illustrating that data for eMBB, URLLC, and mMTC, which are services considered in 5G or NR systems, are allocated in the frequency-time resources.

Referring to FIGS. 3 and 4, there is provided a scheme of allocating frequency and time resources for transmitting information in each system.

FIG. 3 illustrates data for eMBB, URLLC, and mMTC which have been allocated in the entire system frequency band 300. If URLLC data 303, 305, and 307 is generated and needs to be transmitted, while eMBB 301 and mMTC 309 are allocated and transmitted in a predetermined frequency band, parts in which eMBB 301 and mMTC 309 have been already allocated may be evacuated so as to transmit the URLLC data 303, 305, and 307, or scheduled transmission is not performed so as to transmit the URLLC data 303, 305, and 307. Among the services, URLLC needs to reduce latency, and thus, the URLLC data 303, 305, and 307 may be allocated to a part of the resource 301 in which eMBB has been allocated, and may be transmitted. If URLLC is additionally allocated and transmitted in the resource in which eMBB has been allocated, eMBB data may not be transmitted in the overlapping frequency-time resources. Accordingly, the performance of transmission of the eMBB data may be decreased. In this instance, the transmission of the eMBB data may fail due to the allocation of URLLC.

FIG. 4 illustrates data for eMBB, URLLC, and mMTC, which have been allocated in the entire system frequency band 400. The entire system frequency band 400 may be divided into subbands 402, 404, and 406, and the subbands 402, 404, and 406 are used to transmit services and data. Information related to configuration of the sub-bands may be determined in advance, and the information may be transmitted from a base station to a terminal via higher signaling. Alternatively, a base station or a network node may arbitrarily determine the information related to the sub-bands and provide services without separately transmitting sub-band configuration information to a terminal. FIG. 4 illustrates that the sub-band 402 is used for transmission of eMBB data, the sub-band 404 is used for transmission of URCCL data, and the sub-band 406 is used for transmission of mMTC data.

In embodiments of the disclosure, the length of a transmission time interval (TTI) used for URLLC transmission may be shorter than the length of a TTI used for eMBB or mMTC transmission. Also, a response to information related to URLLC may be transmitted earlier than a response time related to eMBB or mMTC, and thus, information may be transmitted or received with low latency.

Figure 5:
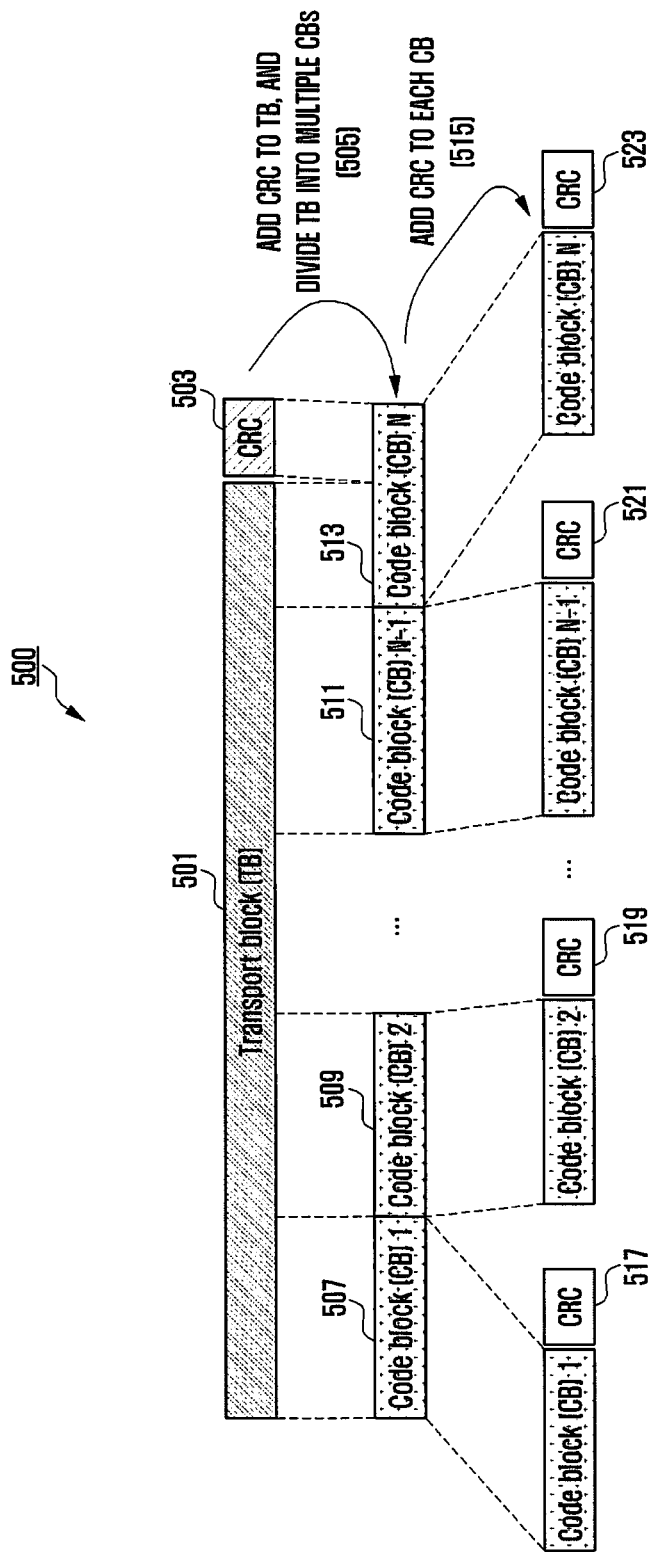
FIG. 5 is a diagram illustrating the architecture in which a single transport block is divided into multiple code blocks, and a CRC is added.

FIG. 5 is a diagram illustrating a process 500 of dividing a single transport block (TB) into multiple code blocks and adding a CRC.

Referring to FIG. 5, a CRC 503 may be added to the last or the front part of a single transport block 501 to be transmitted in an uplink or a downlink. The CRC may have 16 bits, 24 bits, or a predetermined number of bits, or may have bits, the number of which is variable depending on a channel condition or the like. The CRC may be used for determining whether coding is successfully performed. A block 505 including the TB 501 and the CRC 503 may be divided into multiple code blocks (CB) 507, 509, 511, and 513. The maximum size of a code block is determined in advance and is used when division is performed. Therefore, a last code block 513 may be smaller than other code blocks. In this instance, 0, a random value, or 1 is added to the last code block 513 so that the length of the last code block 513 is equal to those of the other code blocks. CRCs 517, 519, 521, and 523 may be added to the code blocks, respectively, as shown in the diagram 515. The CRC may have 16 bits, 24 bits, or a predetermined number of bits, and may be used for determining whether channel coding is successfully performed. However, the CRC 503 added to the TB and the CRCs 517, 519, 521, and 523 added to the code blocks may be omitted depending on the channel code type of a channel code to be added to a code block. For example, if an LDPC code, instead of a turbo code, is applied to a code block, the CRCs 517, 519, 521, 523 to be added to code blocks may be omitted. However, even though an LDPC code is applied to a code block, the CRCs 517, 519, 521, and 523 may be added to code blocks. If a polar code is used, a CRC may be added or may be omitted.

Hereinafter, an eMBB service is referred to as a first type service, and data for eMBB is referred to as first type data. The first type service or first type data is not limited to eMBB, and may correspond to the case that requires high-speed data transmission or broadband transmission. Also, a URLLC service is referred to as a second type service, and data for URLLC is referred to as second type data. The second type service or second type data is not limited to URLLC, and may correspond to other systems that require low latency or high-reliability transmission or requires both low latency and high-reliability transmission. Also, an mMTC service is referred to as a third type service, and data for mMTC is referred to as third type data. The third type service or third type data is not limited to mMTC, and may correspond to the case that requires low-speed, wide coverage, low-power, or the like. Also, in the description of an embodiment, it is understood that the first type service may or may not include the third type service.

In order to transmit three types of services or data, the structure of a physical layer channel used for each type may be different. For example, at least one of the length of a transmission time interval (TTI), a unit of allocation of a frequency resource, the structure of a control channel, and a data mapping method may be different.

Although the description has been provided with reference to three types of services and three types of data, there are various types of services and data corresponding thereto. In this instance, the disclosure may also be applicable.

In order to describe a method and apparatus proposed in an embodiment, terms, a "physical channel" and a "signal" used in the legacy LTE or LTE-A system may be used. However, the disclosure may be applicable to a wireless communication system different from the LTE and LTE-A system.

As described above, an embodiment defines transmission or reception performed between a terminal and a base station for the first type, second type, or third type service or data transmission, and provides a detailed method of operating terminals, for which different types of services or data are scheduled, in the same system. In the disclosure, a first type terminal, a second type terminal, and a third type terminal indicate a terminal for which the first type service or data is scheduled, a terminal for which the second type service or data is scheduled, and a terminal for which the third type service or data is scheduled, respectively. In the embodiment, the first type terminal, the second type terminal, and the third type terminal may be the same terminal, or may be different terminals.

In an embodiment provided below, at least one of a PHICH, an uplink scheduling grant signal, and a downlink data signal is referred to as a first signal. In the disclosure, at least one of an uplink data signal with respect to an uplink scheduling grant and a HARQ ACK/NACK with respect to a downlink data signal is referred to as a second signal. In the embodiment, among signals that a base station transmits to a terminal, a signal that requires a response from the terminal is referred to as a first signal, and a response signal from the terminal in response to the first signal is referred to as a second signal. Also, in the embodiment, the type of service of the first signal is at least one of eMBB, URLLC, and mMTC, and the second signal also corresponds to at least one of the services. For example, in the LTE and LTE-A system, DCI format 0, 0A, 0B or 4, 4A, 4B and a PHICH may be a first signal, and a second signal in response thereto is a PUSCH. Also, for example, in the LTE and LTE-A system, a PDSCH is a first signal. A PUCCH or a PUSCH including HARQ ACK/NACK information with respect to the PDSCH may be a second signal. Also, a PDCCH/EPDCCH or DCI including an aperiodic CSI trigger may be a first signal, and a second signal in response thereto may be a PUCCH or PUSCH including channel measurement information.

Also, in the embodiment provided below, under the assumption that a base station transmits a first signal in an $n^{th}$ TTI, and a terminal transmits a second signal in an $n+k^{th}$ TTI, the fact that the base station informs the terminal of the transmission timing of the second signal is equal to the fact that the base station informs the terminal of the value of k. In this instance, k may be configured by one or more elements. For example, k may be configured to be k=b+a using b and a. In this instance, b is defined in advance depending on the processing ability of a terminal or the capability of the terminal, and a frame structure type (frame structure type 1—FDD, frame structure type 2—TDD, or frame structure type 3—LAA), or may be configured by a base station via a higher signal. For example, in the FDD LTE system, b may be defined in advance as 4, in the case of a terminal in a normal mode. In the case of a terminal in a delay reduce mode, b may be defined in advance as a value smaller than b of the terminal in the normal mode, for example, b=3, or may be configured by a base station. It is assumed that a terminal transmits a second signal in an $n+b+a^{th}$ TTI when a base station transmits a first signal in an $n^{th}$ TTI. In this instance, if b is defined in advance, the fact that the base station informs the terminal of the transmission timing of the second signal is equal to the fact that the base station informs the terminal of an offset value of a. In this instance, the normal mode and the delay reduce mode will be described in detail.

Although the disclosure is described with reference to an FDD LTE system, the disclosure is applicable to a TDD system, LAA system, NR system, and the like.

In the disclosure, higher signaling is a signal transfer method in which a base station transmits a downlink data channel of a physical layer to a terminal, or a terminal transfers an uplink data channel of a physical layer to a base station. The higher signaling may also be referred to as RRC signaling, PDCP signaling, or a MAC control element (MAC CE).

Although the method of determining the transmission timing of a second signal after a terminal or a base station receives a first signal is described in the disclosure, there are various methods of transmitting a second signal. For example, although, after receiving a PDSCH which is downlink data, a terminal determines the timing of transmitting a HARQ ACK/NACK with respect to the PDSCH to the base station according to the method described in the disclosure, a method of selecting a PUCCH format to be used, selecting a PUCCH resource, or mapping HARQ ACK/NACK information to a PUSCH used by the terminal may comply with the method of the legacy LTE.

A terminal receives a PDCCH at time n from a base station, and may be configured, via the received PDCCH, so as to perform PDSCH reception or PUSCH transmission at time n+m. In this instance, m includes 0, and may be defined in advance between the base station and the terminal, may be configured via a higher signal, may be configured via system information such as MIB, SIB, or the like, or may be determined based on information included in the PDCCH. In this instance, m may be configured to be different for each of a PDSCH and a PUSCH. Hereinafter, a description will be provided under the assumption that a terminal receives a PDCCH from a base station at time n, and is configured by the received PDCCH so as to receive a PDSCH at time n+m. However, the disclosure may be applicable to PUSCH transmission.

The terminal that receives a PDSCH at the configured time n+m may be configured or directed by the base station so as to transmit a PDSCH reception result or ACK/NACK information at time n+m+k via a PUCCH or a PUSCH. In this instance, k includes 0, and may be defined in advance between the base station and the terminal, may be configured via a higher signal, may be configured via system information such as MIB, SIB, or the like, or may be determined based on information included in the PDCCH. In this instance, k and m may be expressed based on a symbol, a slot, or a predetermined number of symbols. k and m or the units of k and m may be configured according to a subcarrier spacing that the base station and the terminal use for communication, and k and m or the units of k and m may be different from each other. The base station that receives ACK/NACK information with respect to the PDSCH from the terminal via a PUCCH or PUSCH may retransmit the PDSCH which has been already transmitted to the terminal or may transmit a new PDSCH depending on the PDSCH reception result information transmitted by the terminal.

Hereinafter, in the disclosure, a downlink data channel or a PDSCH that a base station transmits to a terminal is referred to as a first signal or a PDSCH. The result of reception of the first signal or ACK/NACK information is referred to as a second signal, a HARQ-ACK, or an ACK/NACK. In this instance, the second signal may be transmitted to the base station via a PUCCH or a PUSCH. In this instance, a downlink control channel or a PDCCH that the base station transmits to a terminal in order to configure PDSCH reception may be expressed as a first signal. Those skilled in the art may understand whether a first signal is a PDCCH or a PDSCH depending on context.

This will be described in detail as follows. A terminal receives a first signal from a base station at time n (or slot n, or symbol n in slot x). The terminal that receives the first signal may transmit the result of the reception of the first signal, hereinafter, a second signal, to the base station via a PUCCH or a PUSCH, at a predetermined period time (k) after a point in time at which the first signal is received or a PDCCH transmitted for configuring the first signal is received, or at a predetermined period of time (k), determined or indicated by the scheduling information (or DCI)

associated with the first signal, after the point in time at which the first signal or the PDCCH is received.

In this instance, k may be defined in advance between the base station and the terminal on the basis of a symbol in which reception of the first signal begins or ends, or a slot in which the first signal is received, or k may be configured for the terminal by the base station via a higher signal. In this instance, k may be included in the PDCCH transmitted from the base station and may be indicated to the terminal. Also, k may be defined in advance according to a subcarrier spacing used in a cell, may be configured for the terminal by the base station via a higher signal, or may be included in DCI delivered via the PDCCH and may be indicated to the terminal. In this instance, at least one of a second signal transmission time, a transmission start time (symbol or slot), a transmission end time (symbol or slot), a transmission interval length used by the terminal may be defined in advance, may be configured by the base station via a higher signal, or may be a value included in DCI delivered via the PDCCH. For example, the terminal may be configured to perform second signal transmission at time n+k by the first signal received at time n. In this instance, DCI delivered via the PDCCH that configures the terminal to perform first signal reception may include values corresponding to the second signal transmission start symbol, transmission end symbol, transmission interval length (symbol or slot).

Figure 6:
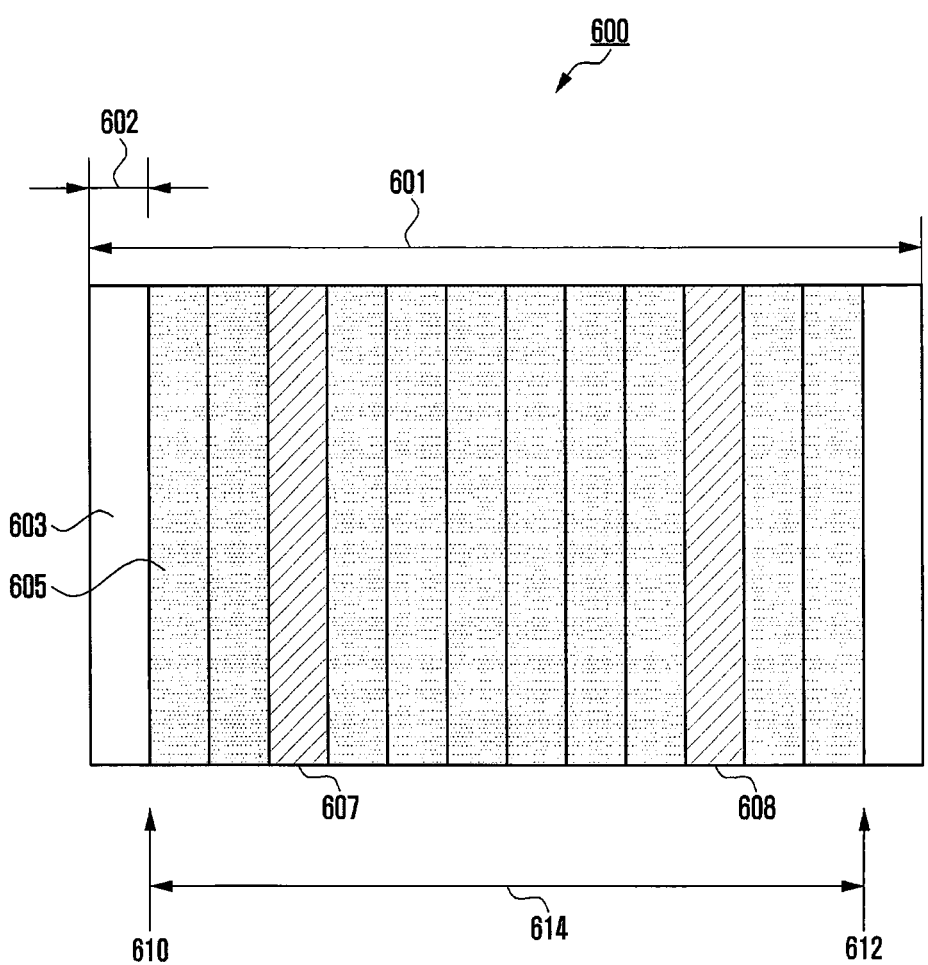
FIG. 6 is a diagram illustrating a method of transmitting uplink control information by a terminal.

A description of the diagram 600 will be provided with reference to FIG. 6. A terminal may be configured by a first signal received in slot n, so as to perform transmission of the result of reception of the first signal or transmission of a second signal in slot n+k 601. In this instance, DCI delivered via a PDCCH that configures the terminal to perform reception of the first signal may include the configuration value of at least one piece of information from among a second signal transmission start symbol 610, a transmission end symbol 612, and a transmission interval length 614. According to an embodiment of the disclosure, the information associated with the transmission interval length 614 may not be included in the first signal. In this instance, the transmission interval length 614 may be defined in advance between the terminal and the base station, or may be configured by the base station via a higher signal. According to another embodiment, the terminal may determine at least one piece of information from among the second signal transmission start symbol 610, the transmission end symbol 612, and the transmission interval length 614, using a slot structure or the like determined based on a PDCCH or DCI different from the PDCCH that the base station uses in order to configure first signal reception, for example, a group common PDCCH or the like. Only information that cannot be obtained from the different PDCCH or DCI may be included and transmitted via the PDCCH that configures the first signal reception.

According to an embodiment, the transmission start time, transmission end time, and transmission interval length may be expressed based on one or more symbols or slots. The transmission start time, transmission end time, and transmission interval length may be expressed based on the same unit, or some or all of them may be expressed based on different units. For example, the transmission start time and the transmission end time may be configured based on one or more symbols, and the transmission interval length may be configured based on one or more slots. Referring to FIG. 6, a second signal of FIG. 6 may be transmitted together with a reference signal (demodulation reference signal (DMRS)) for demodulation of the second signal in at least one symbol 607 and 608. According to an embodiment, the second signal may be transmitted in a resource 605 excluding a frequency and time in which the DMRS is transmitted, and, depending on the case, a part or the whole of the second signal may be included in the DMRS and may be transmitted.

If the configured second uplink signal transmission is performed in an unlicensed band or to a cell or a base station that operates in the unlicensed band, the terminal may perform a channel access procedure with respect to the unlicensed band in which the uplink transmission is configured, before or immediately before the start point of the configured second signal transmission. If it is determined that the unlicensed band is in the idle state, the configured uplink transmission is performed. If it is determined that the unlicensed band is not in the idle state via the channel access procedure performed by the terminal, the terminal may not perform the configured uplink signal transmission. In other words, referring to FIG. 6, the terminal may perform a channel access procedure with respect to the unlicensed band in which the second signal transmission is configured, before the symbol 610 which is configured as the start point of the second signal transmission. If it is determined that the unlicensed band is in the idle state via the channel access procedure that the terminal performs immediately before the start of the second signal transmission, the terminal may perform second signal transmission using symbols from the symbol 610, configured to be the start point of the second signal transmission, to the symbol 612 configured to be the end point of the second signal transmission. If it is determined that the unlicensed band is not in the idle state via the channel access procedure that the terminal performs immediately before the start of the second signal transmission, the terminal does not perform whole the configured second signal transmission, and thus, the base station unnecessarily retransmits the first signal.

Therefore, there is a desire for a method of transmitting a second signal from a terminal to a base station, without additional transmission or retransmission of a first signal unnecessarily performed by the base station, by configuring one or more uplink signal transmission start times or resources for the second signal, or configuring, by the base station, the terminal so as to retransmit the second signal.

Method 1: configures two or more second signal transmission resources, and transmits a second signal via one or more second signal transmission resources which is capable of transmitting the second signal among the configured second signal transmission resources.

According to method 1, two or more PUCCH or PUSCH resources for second signal transmission are configured for a terminal, and the terminal performs second signal transmission using a resource that is capable of transmitting a second signal from among the configured second signal transmission resources. Two or more second signal transmission resources to be used for transmitting the second signal is configured for a terminal, and the terminal determines a resource capable of transmitting the second signal from among the resources, and transmits the second signal. Accordingly, the probability that the terminal transmits the second signal to the base station increases compared to the case in which only a single second signal transmission resource is configured for a terminal and the terminal performs second signal transmission. In this instance, a PUCCH resource is a time and frequency resource defined in advance between the base station and the terminal, and is required to transmit a configured PUCCH transmission format. For example, in the case of the LTE system, an RB pair including 12 subcarriers and 14 symbols is the minimum PUCCH resource.

A terminal that receives a first signal from a base station at time n (or slot n, or symbol n in slot x) may transmit the result of the reception of the first signal, hereinafter, a second signal, to the base station, at a predetermined period time (k) after the point in time at which the first signal is received or a PDCCH transmitted for configuring the first signal is received, or at a predetermined period of time (k), determined or indicated by the scheduling information (or DCI) associated with the first signal, after the point in time at which the first signal or the PDCCH is received. In this instance, a PUCCH frequency resource used when the terminal transmits the second signal may be configured or indicated by PUCCH resource information included in DCI delivered via the PDCCH for configuring the first signal reception. In other words, at least one piece of resource information from among time and frequency resources used for transmitting the second signal may be selected via the PDCCH for configuring the first signal reception.

Figure 7:
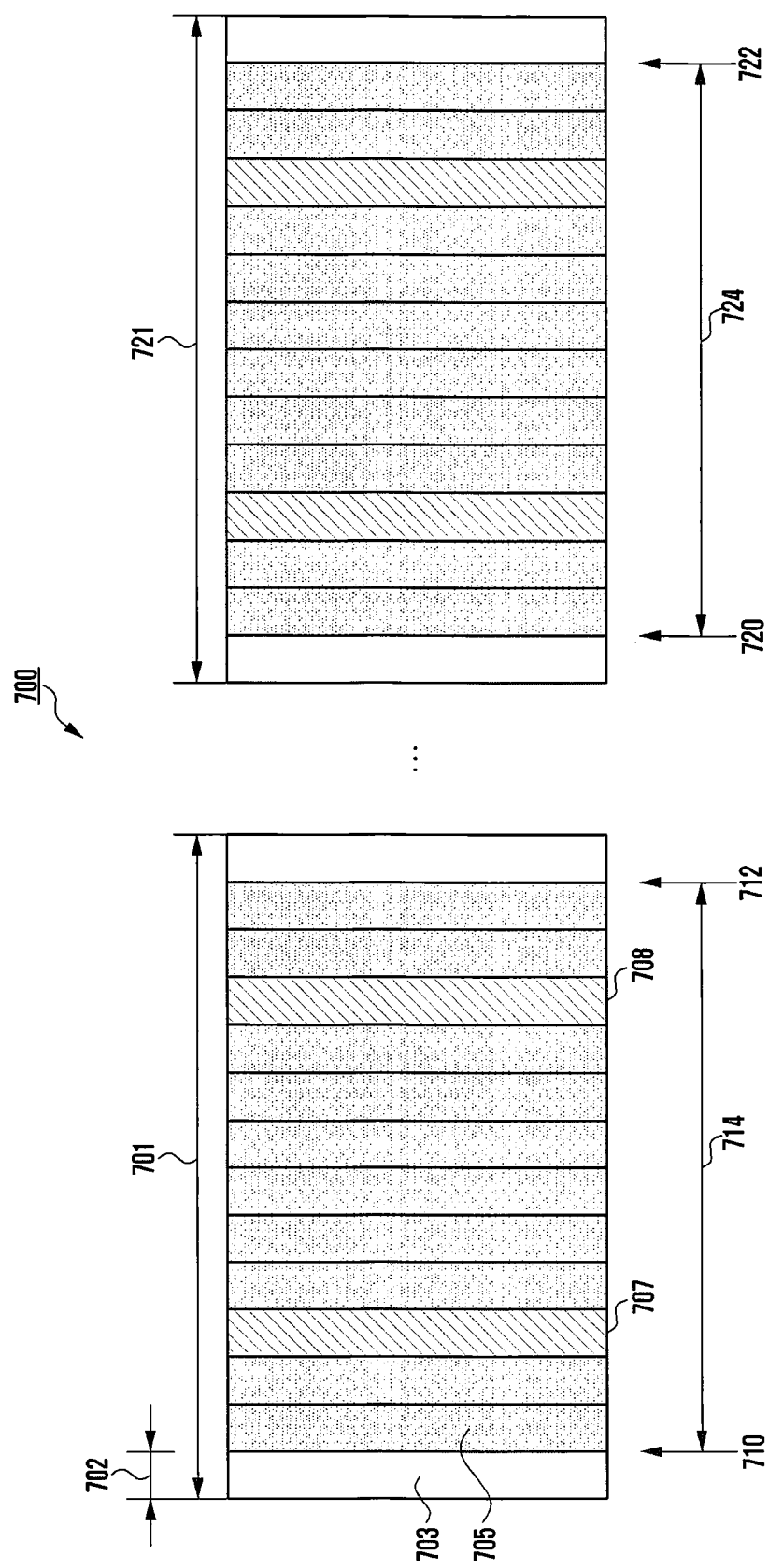
FIG. 7 is a diagram illustrating another method of transmitting uplink control information by a terminal.

Referring to an embodiment 700 of the disclosure illustrated in FIG. 7, a terminal may be configured or directed by a PDCCH, which is received from a base station in slot n and configures first signal reception, so as to perform second signal transmission including at least the result of the reception of the first signal; in slot n+k 701. In this instance, DCI delivered via the PDCCH that configures the first signal reception for the terminal may include the value of at least one piece of information from among a start symbol 710 of the second signal transmission resource, a transmission end symbol 712, and a transmission interval length 714. Alternatively, the value of at least one piece of information from among the start symbol 710 of the second signal transmission resource, the transmission end symbol 712, and the transmission interval length 714 may not be included in the DCI delivered via the PDCCH used for configuring first signal reception, and may be defined in advance between the terminal and the base station, or may be configured for the terminal by the base station via a higher signal. Also, the terminal may determine at least one piece of information from among the second signal transmission start symbol 710, the transmission end symbol 712, and the transmission interval length 714, using a slot structure or the like determined based on a PDCCH or DCI different from the PDCCH that the base station uses in order to configure first signal reception, for example, a group common PDCCH or the like. Information that cannot be obtained from the different PDCCH or DCI may be determined via the PDCCH that configures the first signal reception.

According to an embodiment of the disclosure, a terminal that is configured to be assigned with two or more second signal transmission resources according to method 1, may be further assigned with one or more PUCCH resources 721 for second signal transmission in addition to an initial PUCCH resource for second signal transmission which is configured or indicated via the DCI delivered via the PDCCH for configuring first signal reception.

In this instance, the number of PUCCH resources additionally configured (e.g., K PUCCH resources) may be included in the DCI delivered via the PDCCH for configuring the first signal reception so as to be configured for or indicated to the terminal, may be defined in advanced between the base station and the terminal, may be configured for the terminal by the base station via a higher signal, or may be configured by the base station using system information such as an SIB or a group common PDCCH. In this instance, information associated with a PUCCH resource area additionally configured for the second signal transmission may be the same resource information as configuration information associated with the PUCCH resource for second signal transmission, which is configured or indicated via the DCI delivered via the PDCCH for configuring the first signal reception.

For example, by applying the information associated with the initial PUCCH transmission resource area, that is, the second signal transmission start symbol 710, the transmission end symbol 712, and the transmission interval length 714, to the information associated with the additionally configured PUCCH transmission resource area, that is, a second signal transmission start symbol 720, a transmission end symbol 722, and a transmission interval length 724, the additionally configured PUCCH transmission resource area may be configured without separate additional signaling. In this instance, at least one piece of information among the information associated with the additionally configured PUCCH transmission resource area, that is, the second signal transmission start symbol 720, the transmission end symbol 722, and the transmission interval length 724, may be additionally configured via the DCI delivered via the PDCCH for configuring the first signal reception.

According to an embodiment, the time domain unit of the additionally configured PUCCH resource may be configured as one or more symbols or slots. When the time domain unit of the additionally configured PUCCH resource is configured to be the same as the time domain unit of the initial PUCCH resource, complexity from the perspective of operation of the terminal and the base station may be minimized, so it may be a preferable configuration. However, the time domain unit of the additionally configured PUCCH resource may be configured to be different from the time domain unit of the initial PUCCH resource.

Also, when the additionally configured PUCCH resource is configured to include consecutive uplink symbols or consecutive uplink slots from the initial PUCCH resource, signaling performed between the base station and the terminal in order to configure the additional PUCCH resource may be minimized, so it may be a preferable configuration. However, the additionally configured PUCCH resource may be configured to include uplink symbols or uplink slots a predetermined period of time or a predetermined offset after the initial PUCCH resource. In this instance, the offset value may be included in the DCI delivered via the PDCCH for configuring the first signal reception so as to be configured for, or indicated to, the terminal, may be defined in advance between the base station and the terminal, or may be configured for the terminal by the base station via a higher signal, or may be configured by the base station via system information such as an SIB or a group common PDCCH. In this instance, the offset value may be applied among the additionally configured PUCCH resources.

Figure 8:
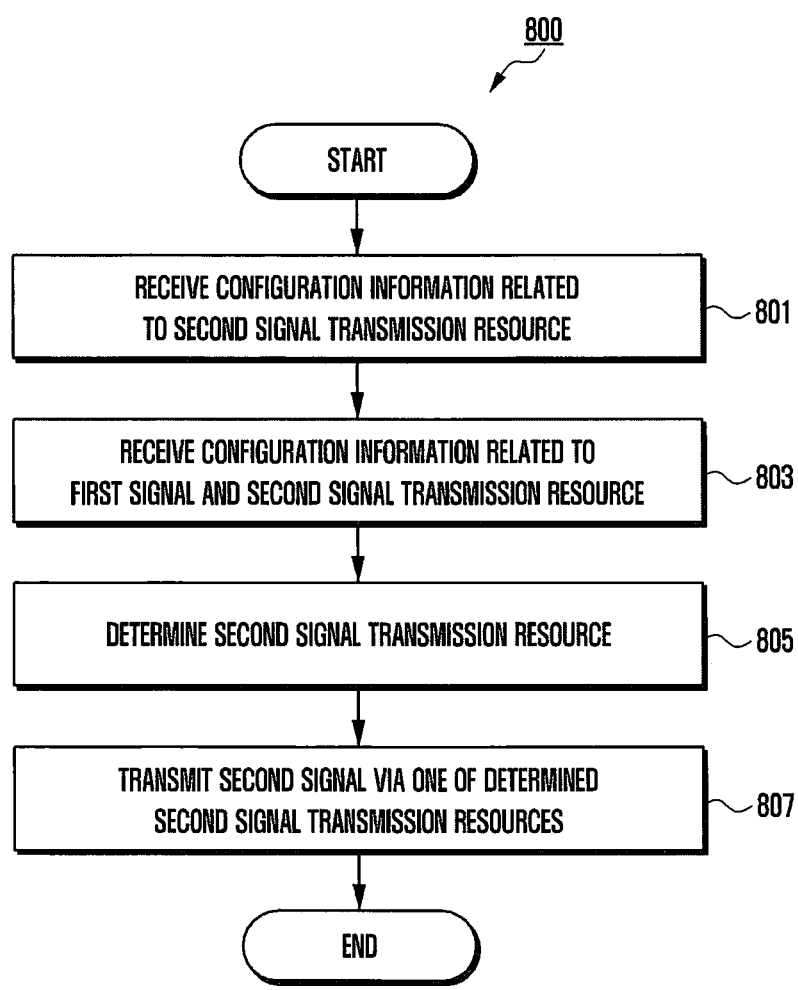
FIG. 8 is a flowchart illustrating operation of a terminal according to embodiments of the disclosure.

The terminal for which two or more PUCCH resources are configured may transmit a second signal via one or X PUCCH resources from among the configured PUCCH resources. This will be described in detail with reference to the flowchart 800 of FIG. 8.

In operation 801, information associated with at least one PUCCH transmission resource from among information associated with an initial PUCCH transmission resource and information associated with additional PUCCH transmission resource for transmitting a second signal is configured for a terminal by a base station. In operation 803, the terminal, which is configured by a PDCCH so as to perform first signal reception, receives additional configuration information associated with a second signal transmission resource or updates previous configuration information via the PDCCH. In operation 805, the terminal determines a resource capable of transmitting a PUCCH from among PUCCH resource areas for transmitting a second signal, which is configured in operations 801 and 803. For example, in the case of a terminal that transmits a second signal via a PUCCH in an unlicensed band, the terminal may perform a channel access procedure with respect to the unlicensed band in which the uplink transmission is configured, before or immediately before the start point of the configured second signal transmission, and may perform the configured uplink transmission when it is determined that the unlicensed band is in the idle state.

When it is determined that the unlicensed band is not in the idle state via the channel access procedure performed by the terminal, the terminal does not perform the configured uplink signal transmission, and may perform a channel access procedure with respect to the unlicensed band in which the uplink transmission is configured, before or immediately before the start point of the additionally configured second signal transmission resource. The terminal transmits, to the base station, a second signal including the result of the reception of the PDCCH received in operation 803, via the PUCCH resource which is determined to be capable of performing uplink transmission in operation 805. In this instance, the terminal may not transmit the second signal in other configured PUCCH resources different from the PUCCH resource determined in operation 805.

However, in the case of a terminal which is configured to transmit a second signal via one or more PUCCH resources (e.g., K PUCCH resources) for securing or extending a transmission area (coverage) in operation 801 or 803, the terminal may repeatedly transmit the second signal in one or more PUCCH resources, or may transmit the second signal in one or more PUCCH resources according to the configuration.

As described above, according to method 1, two or more second signal transmission resources are configured for a terminal, and the terminal transmits a second signal using at least one available resource from among the configured second signal transmission resources. Accordingly, compared to the case in which a terminal that transmits a second signal using only a single second signal transmission resource, the probability that a terminal transmits a second signal to a base station increases. Accordingly, the overall system throughput may be increased.

As another method of increasing the probability that a terminal transmits a second signal to a base station, there is a method of enabling a terminal to transmit, to the base station, the result of reception of a first signal which has already been transmitted to the terminal, without retransmission of the first signal by the base station, as follows.

Method 2: a method in which a terminal (re)transmits the result of reception of a first signal, which has been received, via an uplink data channel (PUSCH) without additional reception of the first signal, according to configuration by a base station.

The method 2 will be described as follows.

In the case in which a terminal transmits a second signal in an unlicensed band in an uplink, the terminal performs a channel access procedure with respect to an unlicensed band in which the uplink transmission is configured, before or immediately before a configured second signal transmission start point. If the result of the access procedure shows that the unlicensed band is in the idle state, the configured uplink transmission is performed. If the result of the access procedures shows that the unlicensed band is not in the idle state, the terminal may not perform the configured uplink signal transmission. Therefore, the base station may configure the terminal to transmit the second signal again if a terminal that receives a first signal at time n fails to transmit the result of reception of the first signal at n+k, or if a base station fails to receive a second signal from the terminal at time n+k. To this end, the base station may include an indicator for configuring transmission including the result of reception of a first signal, in a PDCCH, UL grant, or DCI format for configuring uplink data transmission (hereinafter, PUSCH transmission), and transmit the same to the terminal. According to an embodiment, a HARQ-ACK request field indicating transmission of the result of reception of a first signal may be added to the UL grant.

According to an embodiment, the case in which a terminal receives a UL grant at time n, and the received UL grant includes a HARQ-ACK request field will be described. If the HARQ-ACK request field is configured to indicate transmission of the result of reception of a first signal, for example, if the value of the HARQ-ACK request field is set to 1, the terminal includes the result of reception of a first signal in PUSCH transmission at time n+k configured by the UL grant, and may perform transmission to a base station. In this instance, the result of reception of the first signal may be transmitted by puncturing the PUSCH transmission, or may be transmitted by performing rate-matching of the configured PUSCH transmission with respect to the result of reception of the first signal.

When the terminal performs the PUSCH transmission including the result of reception of the first signal, the base station needs to be aware of the size or the number of bits associated with the first signal reception result transmitted from the terminal, so as to correctly receive the PUSCH and the first signal reception result. In other words, the base station and the terminal need to be aware of the size or the number of bits associated with the result of the reception of the first signal as the same value. To this end, the base station may include an indicator indicating the number of TBs or PDSCHs scheduled for the terminal by the base station, or the number of PDSCH reception results to be transmitted to the base station in response to PDSCHs that the terminal receives from the base station, in a PDCCH, UL grant, or DCI format for configuring PUSCH transmission for the terminal.

For example, a downlink assignment index (DAI) field may be added to the UL grant. The DAI may include at least the information indicating the total number of PDSCH reception results (total DAIs) that the terminal needs to transmit to the base station. One DAI value may indicate the total number of one or more PDSCH reception results that the terminal needs to transmit to the base station or a set of the total number of PDSCH reception results that the terminal needs to transmit to the base station. For example, a DAI value of 0 (or 00) may indicate one of the values in a set of the total number of PDSCH reception results which the terminal needs to transmit to the base station, {1, 5, 9, 13, 17, 21, 25, 29}. According to an embodiment, the terminal may determine that a value, which is greater than or equal to the number of PDSCHs received until a UL grant including the DAI value is received, is the total number of PDSCH reception results which the base station directs the terminal to transmit. In other words, the base station uses the DAI value in order to indicate PDSCH reception results which the base station needs to receive from the terminal, and the terminal may determine the number of PDSCH reception results which the terminal needs to transmit to the base station, using the number of received PDSCHs and the received DAI value.

Figure 9:
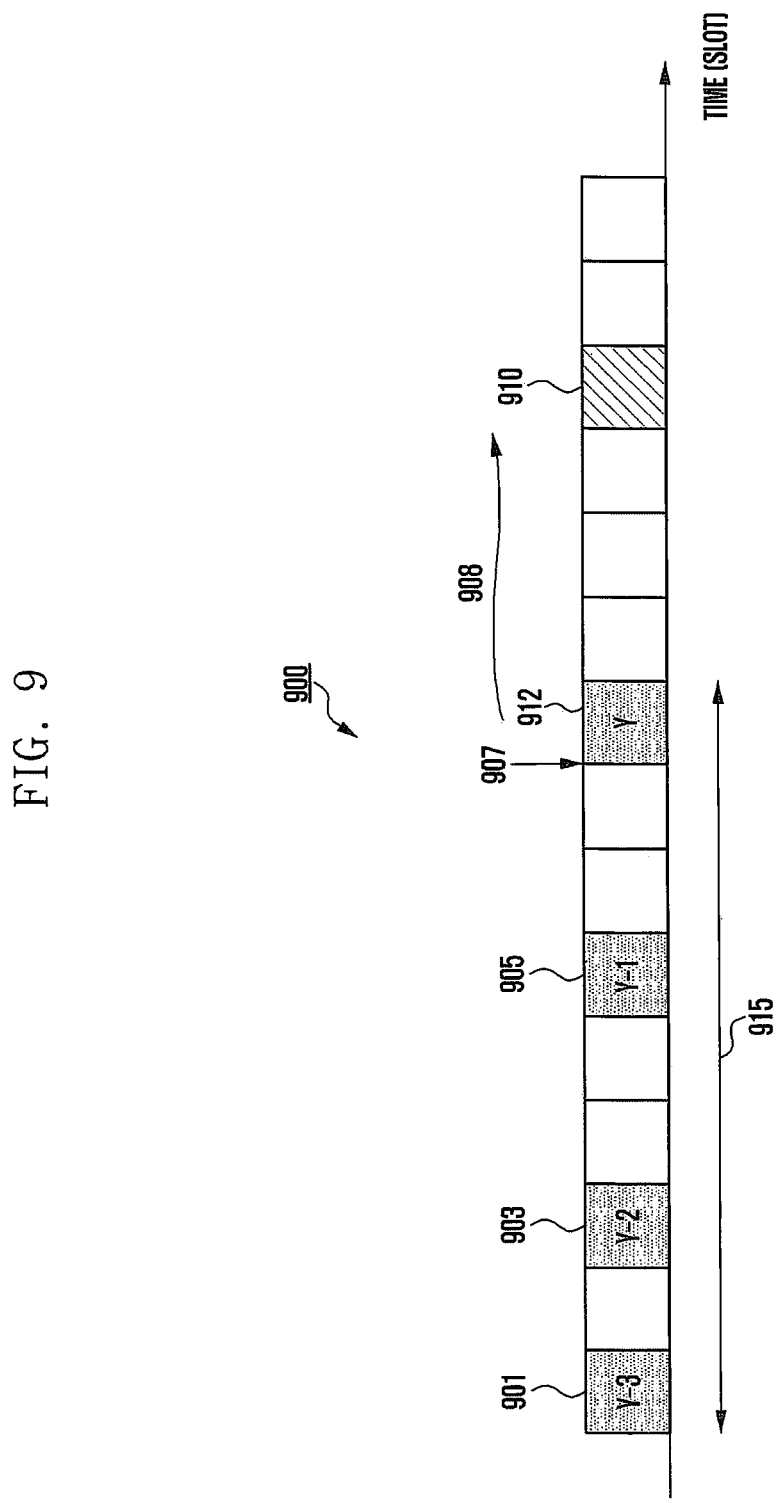
FIG. 9 is a diagram illustrating another method of transmitting uplink control information by a terminal.

This will be described in detail with reference to an embodiment 900 of FIG. 9.

The case in which a terminal receives a UL grant 908 for configuring PUSCH transmission at time n+k 910 from a base station via a PDCCH at time n 907 will be described. If the received UL grant 908 includes a HARQ-ACK request field and a DAI field, and the HARQ-ACK request field is configured to direct the terminal to transmit or report a first signal reception result to the base station, the terminal may obtain or determine the total number Y 912 of PDSCH reception results that the terminal needs to transmit to the base station, using the DAI field included in the UL grant. If the HARQ-ACK request field is configured to indicate transmission of a first signal reception result, for example, if the value of the HARQ-ACK request field is set to 1, the terminal may include the results of reception of Y first signals 912 which are most recently received on the basis of time n 907 from among first signal reception results, in data transmission or PUSCH transmission 910 at time n+k configured by the UL grant 908 received at time n 907, and may transmit the same to the base station.

In this instance, the first signal reception result may be transmitted by puncturing some of one or more symbols among the symbols in which the PUSCH 910 is transmitted, or may be transmitted by performing rate-matching of the configured PUSCH with respect to the first signal reception result which are transmitted using one or more symbols.

In this instance, the symbol in which the first signal reception result is transmitted may be symbol (i−1) or symbol (i+1), or may be symbol (i−1) and symbol (i+1) based on symbol (i) in which a DMRS is transmitted from among the symbols in which the configured PUSCH is transmitted. If the DMRS is transmitted in one or more symbols (k) in addition to the symbol (i) in the PUSCH transmission, the first signal reception result may be additionally transmitted in symbol (k−1) or symbol (k+1), or symbol (k−1) and symbol (k+1) on the basis of the symbol (k), in addition to the transmission based on the symbol (i). In this instance, even when the DMRS is transmitted in one or more symbols in the PUSCH transmission, the first signal reception result may be transmitted in one or more symbols according to the above-described method on the basis of the DMRS symbol (i) which is transmitted first.

Also, a subcarrier in which the first signal reception result is transmitted may be transmitted in an ascending order of an RB or subcarrier index, from an RB or a subcarrier having the lowest index to an RB or subcarrier having the highest index, in the frequency resource area used for the configured PUSCH transmission. Also, a subcarrier in which the first signal reception result is transmitted may be transmitted in a descending order of an RB or subcarrier index, from an RB or subcarrier having the highest index to an RB or subcarrier having the lowest index, in the frequency resource area used for the configured PUSCH transmission.

In this instance, at least one of the results of reception of the Y first signals 912 that the terminal transmits to the base station may be first signal reception results which are transmitted to the base station at time n at which a UL grant configuring the terminal to transmit a first signal reception result is received or at time n+k at which a first signal reception result is transmitted via a PUSCH, or at and before time n or time n+k. In other words, irrespective of whether a first signal reception result is transmitted to the base station, the terminal may transmit, to the base station, first signal reception results, the number of which corresponds to the value indicated by the DAI 912 of the base station. In this instance, the terminal may transmit results of reception of latest Y first signals, remaining after excluding results of reception of first signals which are transmitted to the base station at time n at which a UL grant configuring the terminal to transmit a first signal reception result is received or at time n+k at which a first signal reception result is transmitted via a PUSCH, or at and before time n or time n+k, from the results of reception of Y first signals 912.

However, the base station may request the terminal to transmit a first signal reception result since the base station does not correctly receive a first signal reception result transmitted from the terminal. Accordingly, the terminal may transmit first signal reception results, the number of which corresponds to the value indicated by the DAI of the base station, irrespective of whether a first signal reception result is transmitted to the base station, which may be preferable. According to an embodiment, the terminal may configure (multiplex) results of reception of most recently received first signals, the number of which correspond to a DAI value, in order of reception of the first signals, from among the first signal reception results that have been received, and may transmit the same to the base station.

According to an embodiment, the base station may include a field indicating a time interval for determining a reception result associated with an effective PDSCH which the terminal needs to transmit to the base station, for example, a HARQ-ACK window 915, in a PDCCH, UL grant, or DCI format for configuring PUSCH transmission for the terminal, instead of including the DAI. In this instance, the HARQ-ACK window may indicate one or more symbols or slots as shown in Table 5.

TABLE 5

| HARQ-ACK window | Number of symbol/slots (T) |
| --- | --- |
| 00 | 8 |
| 01 | 16 |
| 10 | 24 |
| 11 | 32 |

This will be described in detail as follows. The case in which a terminal receives the UL grant 908 for configuring PUSCH transmission at time n+k 910 from a base station via a PDCCH at time n 907 will be described. The received UL grant 908 includes a HARQ-ACK request field and a HARQ-ACK window field, and the HARQ-ACK request field is configured to direct the terminal to transmit or report a first signal reception result to the base station. Also, if the HARQ-ACK window field included in the UL grant indicates a time or symbols or slots T 915, the terminal may transmit results of reception of first signals received from the base stations at the point T slots or T time 915, indicated by the HARQ-ACK window field, ahead of time n at which the UL grant 908 is received, at the point T slots or T time, indicated by the HARQ-ACK window field, ahead of time n+k at which a first signal reception result is transmitted via the PUSCH 910, or at the point T slots or T time, indicated by the HARQ-ACK window field, ahead of time n or n+k, including time n or time n+k.

In this instance, similar to the DAI, the base station needs to be aware of the number of first signal reception results that the terminal transmits. To this end, the terminal may transmit, to the base station, the results of reception of all first signals including first signals and receivable first signals received from the base station during the configured time interval T. For example, if T 915 expresses a slot and the terminal is capable of receiving a maximum of one PDSCH for each slot T, the terminal may transmit a total of T first signal reception results to the base station via the configured PUSCH.

In this instance, in the cases 901, 903, 905, and 908 in which the terminal actually receives first signals among T first signals, the terminal may transmit the results of actual reception of the first signals to the base station. In the case in which the terminal actually does not receive first signals from among T first signals, in other words, with respect to the slots excluding the slots 901, 903, 905, and 908 in which the first signals are received in the interval T 915, first signal reception results may be processed as NACKs or DTXs and may be transmitted to the base station. The base station that receives the above-described first signal reception results from the terminal, may check the first signal reception results transmitted from the terminal with respect to the first signals that the base station actually transmit to the terminal, and may retransmit first signals that the terminal fails to correctly receive. The terminal may configure (multiplex) first signal reception results sequentially from the result of reception of a first signal associated with the start point of the indicated interval T, for example, time n-T, and may transmit the same.

According to an embodiment, the value of HARQ-ACK window may be defined in advance between the base station and the terminal, or may be received by the terminal from the base station via a higher signal, or may be configured via system information such as SIB or group-common PDCCH. According to the embodiment, the HARQ-ACK window field may not be included in the UL grant 908 which is received via a PDCCH from the base station and configures PUSCH transmission at time n+k 910. In this instance, if the HARQ-ACK request field included in the UL grant 908, which is received via the PDCCH from the base station and configures PUSCH transmission at time n+k 910, is configured to direct the terminal to transmit or report a first signal reception result to the base station, the terminal may transmit T first signal reception results to the base station in the configured PUSCH 910 using a defined or configured HARQ-ACK window value of T, according to method 2.

Figure 10:
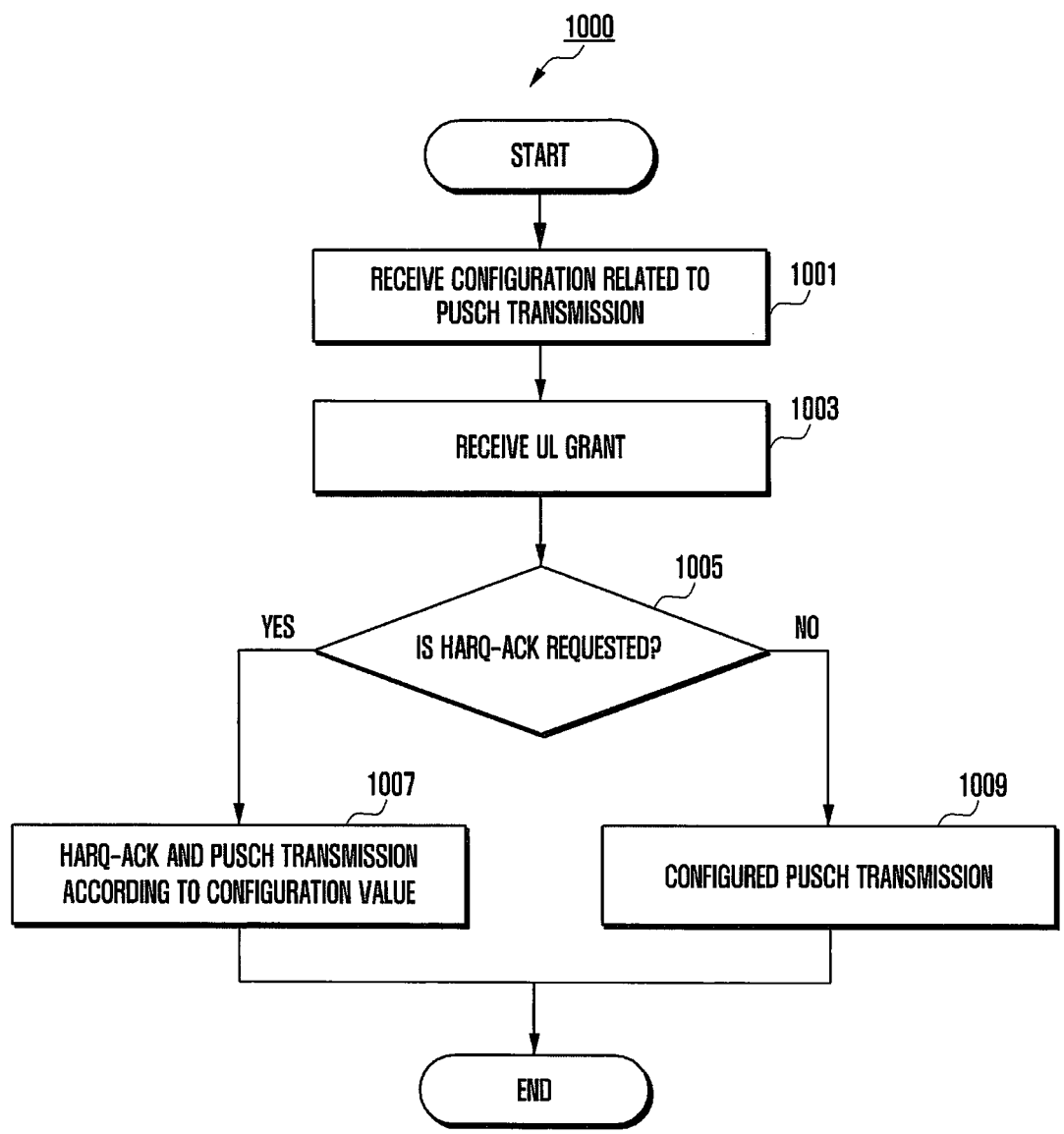
FIG. 10 is a flowchart illustrating operation of a terminal according to embodiments of the disclosure.

An operation 1000 of a terminal will be described with reference to FIG. 10 as follows.

In operation 1001, the terminal may receive configuration information associated with PUSCH transmission from a base station via a higher signal. The configuration information may include some or all of information required when the terminal performs PUSCH transmission, such as time and frequency resource area information associated with PUSCH transmission, DMRS information, information associated with a UL grant reception time and PUSCH transmission time, numerology information used for PUSCH transmission, and the like. In operation 1003, the terminal receives a UL grant for configuring PUSCH transmission at time n+k via a PDCCH from the base station at time n.

In operation 1005, the terminal determines whether a HARQ-ACK request field included in the received UL grant is configured to direct the terminal to transmit or report a first signal reception result to the base station. When it is determined that the HARQ-ACK request field included in the received UL grant is configured to direct the terminal to transmit or report a first signal reception result to the base station, the terminal may transmit the first signal reception result and uplink data information to the base station via an uplink transmission resource configured in operation 1003 using other information included in the UL grant, for example, a DAI value, a HARQ-ACK window, or the like, according to the method 2. If the HARQ-ACK request field included in the received UL grant is not configured to direct the terminal to transmit or report a first signal reception result to the base station, the terminal may transmit uplink data information to the base station via the uplink transmission resource configured in operation 1003.

According to an embodiment of the disclosure, although the HARQ-ACK request field is not included in the UL grant 908, the terminal may transmit or report a first signal reception result to the base station via the PUSCH 910 of which transmission is configured by the UL grant. For example, in the case in which a terminal receives the UL grant 908 that configures PUSCH transmission at time n+k 910 from the base station via a PDCCH at time n 907, and the HARQ-ACK request field is not included in the received UL grant 908 but at least one of a DAI or a HARQ-ACK window field is included, or in the case in which a terminal is configured by the base station via a higher signal so as to transmit or report a first signal reception result to the base station via an uplink data channel, the terminal may transmit or report a first signal reception result to the base station using a value indicated by at least one field from among the DAI or HARQ-ACK window field included in the UL grant.

In other words, although the HARQ-ACK request field is not included in the UL grant, the terminal may always transmit first signal reception results, the number of which is indicated by the DAI field or the HARQ-ACK window field, to the base station in the configured PUSCH 910. Accordingly, the terminal may (re)transmit first signal reception results to the base station via the uplink data channel.

Method 2 of the disclosure has been described under the assumption that, when a base station schedules or configures uplink data channel transmission of a terminal, the terminal transmits a first signal reception result, reporting or transmission of which is requested by the base station, together with uplink data information via an uplink data channel. However, method 2 may be applicable to the case in which a terminal transmits a first signal reception result, reporting or transmission of which is requested by the base station, via the uplink data channel, without transmission of uplink data information.

For example, when a HARQ-ACK request field is included in the UL grant that schedules the uplink data channel, and the UL grant releases or disables uplink TB transmission, more particularly, when the value of a predetermined field of the UL grant is set to a predetermined value, for example, an MCS has a value greater than or equal to Z1, and Z2 RBs are allocated (in this instance, Z1=28, Z2=4 or 10), the terminal may determine to transmit or report only a first signal reception result to the base station via the uplink data channel without transmission of uplink data information, and may transmit or report the first signal reception result to the base station via the uplink data channel.

In this instance, the terminal may transmit channel quality state information (channel state information) via an uplink data channel according to the configuration of a CSI request field included in the UL grant. The case in which a terminal is configured to report channel quality state information or a first signal reception result without transmission of uplink data information, and a DAI field or a HAQR-ACK window field does not exist in the UL grant which configures the uplink data channel, but a HARQ process ID (P) is included, will be described.

In this instance, the terminal may transmit or report the result of reception of a PDSCH corresponding to the HARQ process ID indicated by the UL grant, the results of reception of PDSCHs most recently received based on a time or slot at which the UL grant is received, the number of which corresponds to the value (P) indicated by the HARQ process ID field, the results of reception of downlink data channels (PDSCHs) corresponding to HARQ process ID 0 to P, including the HARQ process ID indicated by the UL grant, or the results of reception of PDSCHs corresponding to HARQ process ID p to the maximum HARQ process ID (Pmax), including the HARQ process ID indicated by the UL grant, to the base station via the uplink data channel.

In the case of a PDSCH that the terminal actually does not receive from among downlink data channels (PDSCHs) corresponding to HARQ process ID 0 to P or HARQ process ID p to the maximum process ID (Pmax), the terminal may determine the result of reception of the corresponding PDSCH as a NACK, DTX, or the like, and may transmit or report the same to the base station. In this instance, if at least one of a DAI field or a HARQ-ACK window field exists in the UL grant that configures the uplink data channel, the terminal transmits or reports a first signal reception result to the base station via the uplink data channel, on the basis of the DAI or HARQ-ACK window according to method 2.

According to an embodiment, the base station may configure a PDSCH reception results which the terminal needs to transmit to the base station according to at least one field among the DAI field, HARQ-ACK window field, or HARQ-ACK request field. For example, if the HARQ-ACK request field is configured as 2 bits, the base station may configure the terminal to transmit the result of reception of a PDSCH corresponding to a predetermined HARQ process ID to the base station, using the HARQ-ACK request field, as shown in Table 6 or Table 7. In this instance, a HARQ process ID that the terminal needs to transmit, listed in Table 6 or Table 7, is merely an example. In the case of Table 7, the terminal may determine a PDSCH reception result which the terminal needs to transmit to the base station by performing a modulo operation between an HARQ process ID indicated in Table 7 and the maximum HARQ process ID defined in advance or configured for the terminal via a higher signal.

TABLE 6

| HARQ-ACK request | Requested HARQ-ACK |
| --- | --- |
| 00 | None |
| 01 | HARQ process P |
| 10 | P latest HARQ processes |
| 11 | All HARQ processes |

TABLE 7

| HARQ-ACK request | Requested HARQ-ACK |
| --- | --- |
| 00 | None |
| 01 | HARQ process P, P + 3, P + 6, . . . |
| 10 | HARQ process P + 1, P + 4, P + 7, . . . |
| 11 | HARQ process P + 2, P + 5, P + 8, . . . |

Method 3: a method in which a terminal (re)transmits the result of reception of a first signal, which has been received, via an uplink control channel (PUCCH) to a base station, without additional reception of the first signal, according to configuration by the base station.

In the case of a terminal that transmits a second signal in an unlicensed band, the terminal may perform a channel access procedure with respect to the unlicensed band in which the uplink transmission is configured, before or immediately before the start point of the configured second signal transmission, and may perform the configured uplink transmission only when it is determined that the unlicensed band is in the idle state. If the result of the channel access procedure shows that the unlicensed band is not in the idle state, the terminal may not perform the configured uplink signal transmission.

Therefore, the base station may configure the terminal to transmit the second signal again if a terminal that receives a first signal at time n fails to transmit the result of reception of the first signal at n+k, or if a base station fails to receive a second signal from the terminal at time n+k. To this end, the base station may configure the terminal using a PDCCH, a DL grant, or DCI format that configures downlink data reception (hereinafter PDSCH reception), so as to transmit the result of reception of a first signal via an uplink control channel.

When the terminal transmits a PUCCH including the first signal reception result, the base station needs to be aware of the size or the number of bits associated with the first signal reception result transmitted from the terminal, so as to correctly receive the first signal reception result transmitted via the PUCCH. In other words, the base station and the terminal need to be aware of the size or the number of bits of the first signal reception result as the same value.

To this end, in a PDCCH, DL grant, or DCI format for configuring downlink data reception (hereinafter, PDSCH reception) for the terminal, the base station may include a downlink assignment index (DAI) field and an indicator indicating the number of TBs or PDSCHs scheduled for the terminal by the base station, or the number of PDSCH reception results to be transmitted to the base station in response to PDSCHs that the terminal receives from the base station, in the DL grant.

Here, the DAI may include at least the information indicating the total number of PDSCH reception results (total DAI) that the terminal needs to transmit to the base station. One DAI value may indicate the total number of one or more PDSCH reception results that the terminal needs to transmit to the base station or a set of the total number of PDSCH reception results that the terminal needs to transmit to the base station. For example, a DAI value of 0 (or 00) may indicate one of the values in a set of the total number of PDSCH reception results that the terminal needs to transmit to the base station, {1, 5, 9, 13, 17, 21, 25, 29}. In this instance, the terminal may determine that a value, which is greater than or equal to the number of PDSCHs received until a UL grant including the DAI value is received, is the total number of PDSCH reception results which the base station directs the terminal to transmit. In other words, the base station uses a DAI value transmitted to the terminal in order to indicate PDSCH reception results which the base station needs to receive from the terminal, and the terminal may determine the number of PDSCH reception results which the terminal needs to transmit to the base station, using the number of received PDSCHs and the received DAI value.

Figure 11:
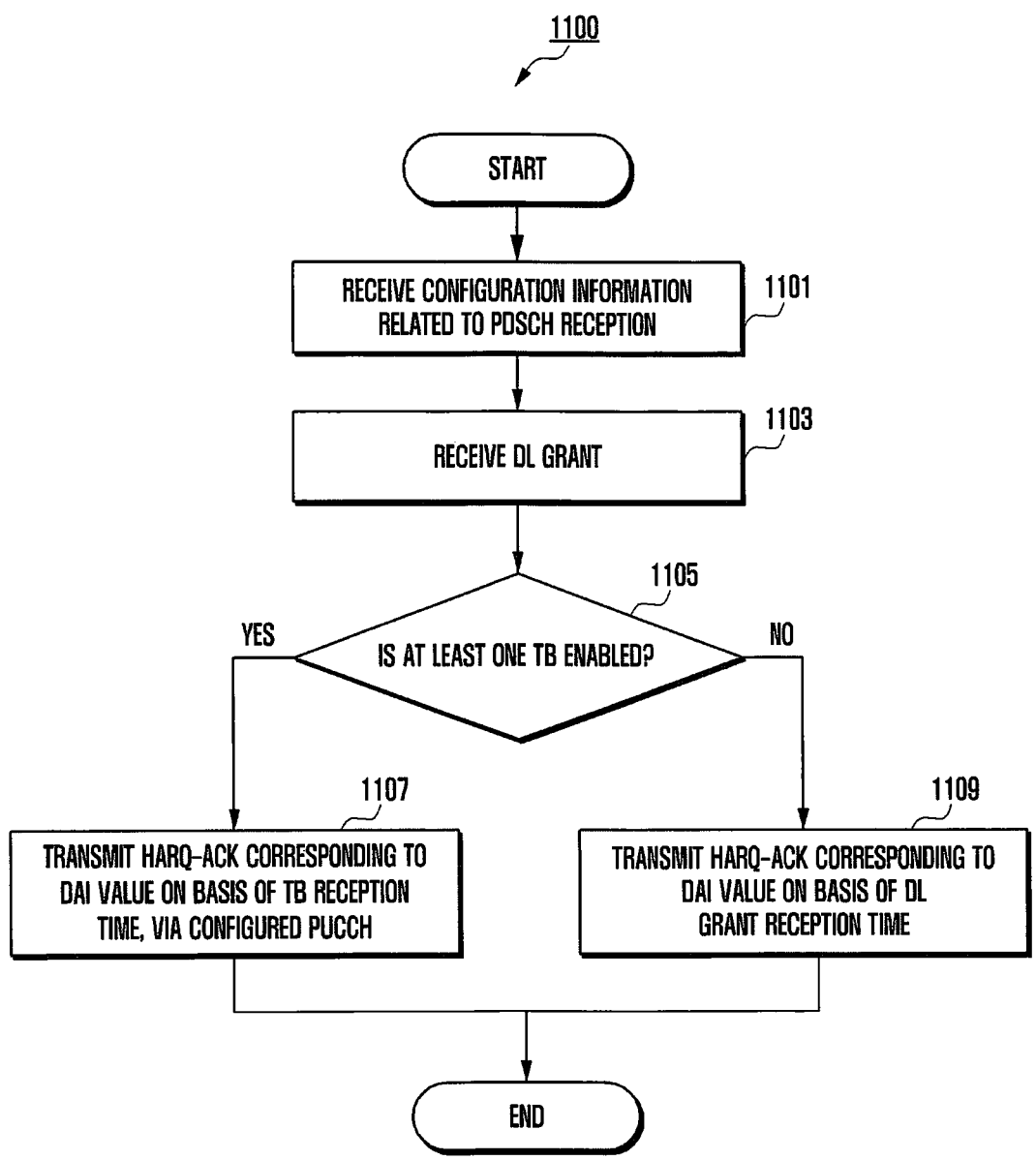
FIG. 11 is a flowchart illustrating another example of operation of a terminal according to embodiments of the disclosure.

An operation 1100 of a terminal will be described with reference to FIG. 11 as follows.

In operation 1101, the terminal may receive configuration information associated with PDSCH transmission from a base station via a higher signal. The configuration information may include some or all of information required when the terminal receives a PDSCH, such as time and frequency resource area information associated with PDSCH transmission, DMRS information, a DL grant reception time and PDSCH transmission time, information associated with a PDSCH reception time and HARQ-ACK report time and the like, numerology information used for PDSCH reception, and the like. In operation 1103, the terminal receives a DL grant for configuring PDSCH reception at time n+k via a PDCCH from the base station at time n.

In operation 1105, the terminal determines, based on the received DL grant, whether at least one transport block (TB) is enabled/disabled. For example, when an MCS value corresponding to a TB is set to a predetermined value, for example, when the MCS value is set to 0, the terminal may determine that the TB is disabled, and may not perform reception of the corresponding TB. In this instance, the terminal may determine whether the predetermined TB is enabled or disable by additionally determining whether another field value besides the MCS value, for example, a redundancy version (RV), is set to a predetermined value, that is, by using the MCS and RV values.

If the terminal determines, based on the DL grant received in operation 1103, that at least one TB is enabled in operation 1105, the terminal may transmit the results of reception of most recently received first signals on the basis of a time or slot in which the enabled TB is received, as many as the number (Y) of first signal reception results that the terminal needs to transmit or report to the base station, Y being indicated by a DAI field of the DL grant, from among the previously received first signal reception results, via a PUCCH resource configured by the DL grant, including the results of reception of the enabled TBs, in operation 1107. If the terminal determines, based on the DL grant received in operation 1103, that all TBs are disabled in operation 1105, the terminal may transmit the results of reception of most recently received first signals on the basis of a time at which the DL grant is received, as many as the number (Y) of first signal reception results that the terminal needs to transmit or report to the base station, Y being indicated by the DAI field of the DL grant, via a PUCCH resource configured by the DL grant, in operation 1109.

In this instance, in operation 1107, the terminal may transmit the result of reception of the enabled TB and the results of reception of most recently received first signals, the number of which corresponds to the number (Y) of first signal reception results that the terminal needs to transmit or report to the base station, Y being indicated by the DAI field of the DL grant, from among the previously received first signal reception results on the basis of a time at which the DL grant is received, via a PUCCH resource configured by the DL grant. The terminal may configure (multiplex) most recently received first signal reception results the number of which corresponds to a DAI value in order of reception of the first signals, from among the results of reception of first signals that have been received, and may transmit the same to the base station.

Figure 12:
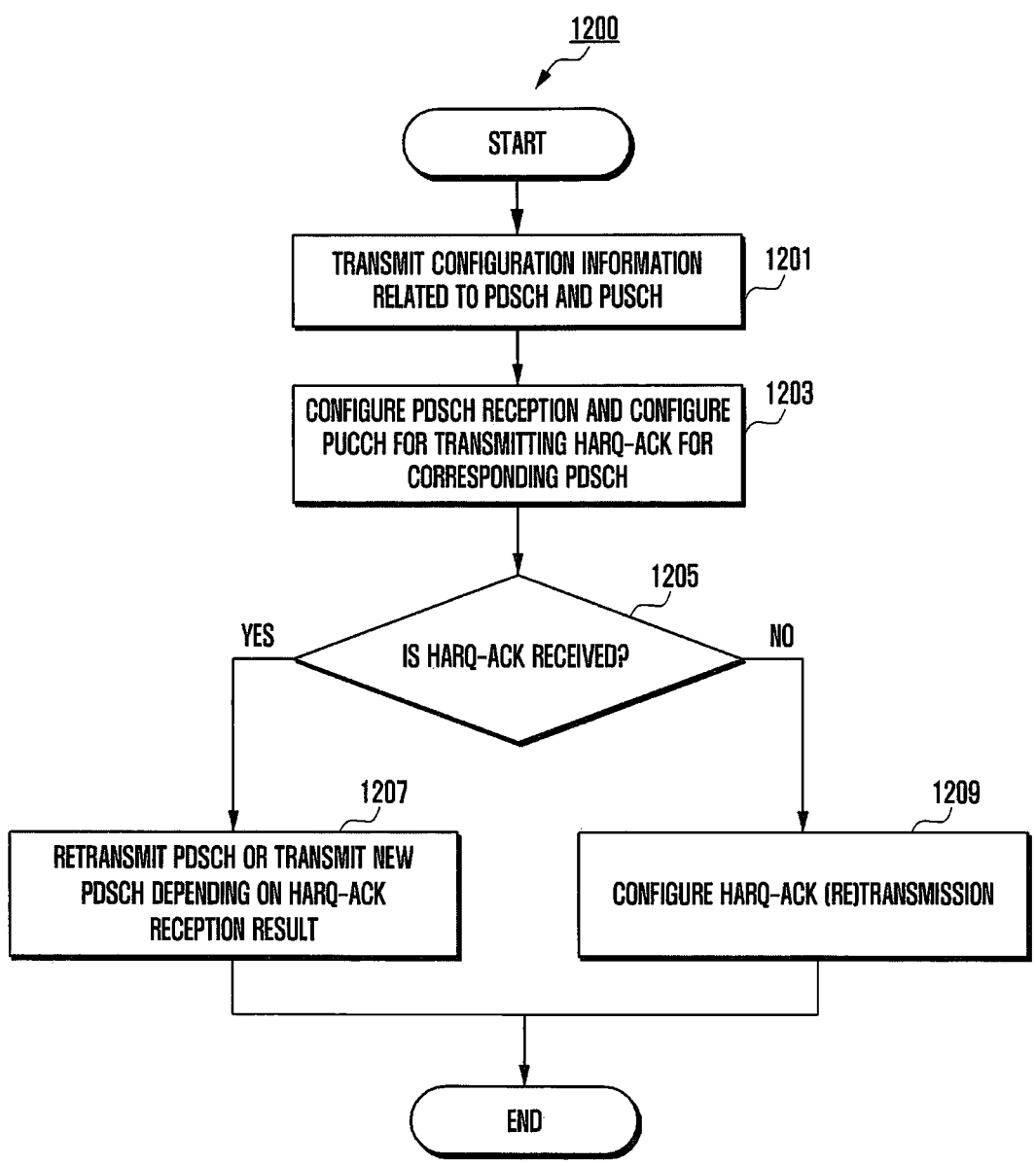
FIG. 12 is a flowchart illustrating operation of a base station according to various embodiments of the disclosure.

An operation 1200 of a base station will be described with reference to FIG. 12 as follows.

In operation 1201, the base station transmits and configures configuration information associated with PDSCH reception and PUSCH transmission for a terminal via a higher signal. The configuration information may include some or all of information required when the terminal performs PDSCH reception, such as time and frequency resource area information associated with PDSCH transmission, DMRS information, information associated with a DL grant reception time and PDSCH transmission time, information associated with a PDSCH reception time and HARQ-ACK report time, and the like, numerology information used for PDSCH reception, and the like, and may include some or all of information required when the terminal performs PUSCH transmission, such as time and frequency resource area information associated with PUSCH transmission, DMRS information, information associated with a UL grant reception time and PUSCH transmission time, numerology information used for PUSCH transmission, and the like.

In operation 1203, the base station transmits a DL grant including time and frequency resource configuration information associated with PDSCH reception at time n+k and a PUCCH for performing transmission including at least the HARQ-ACK information with respect to the PDSCH, to the terminal at time n, and may transmit a PDSCH at time n+k. In operation 1205, the base station receives a PUCCH transmitted from the terminal at the PUCCH transmission time and frequency resource configured for the terminal.

If it is determined that the terminal does not transmit a PUCCH in operation 1205, or if it is determined that the base station does not correctly receive a PUCCH transmitted from the terminal, the base station may configure the terminal so as to transmit or report a PDSCH reception result including at least the result of reception of the PDSCH transmitted in operation 1203 according to the method proposed in the embodiment of the disclosure in operation 1209. If the base station correctly receives the PUCCH transmitted from the terminal in operation 1205, the terminal may retransmit the PDSCH or may transmit a new PDSCH in operation 1207 depending on the PDSCH reception result received from the terminal.

Figure 13:
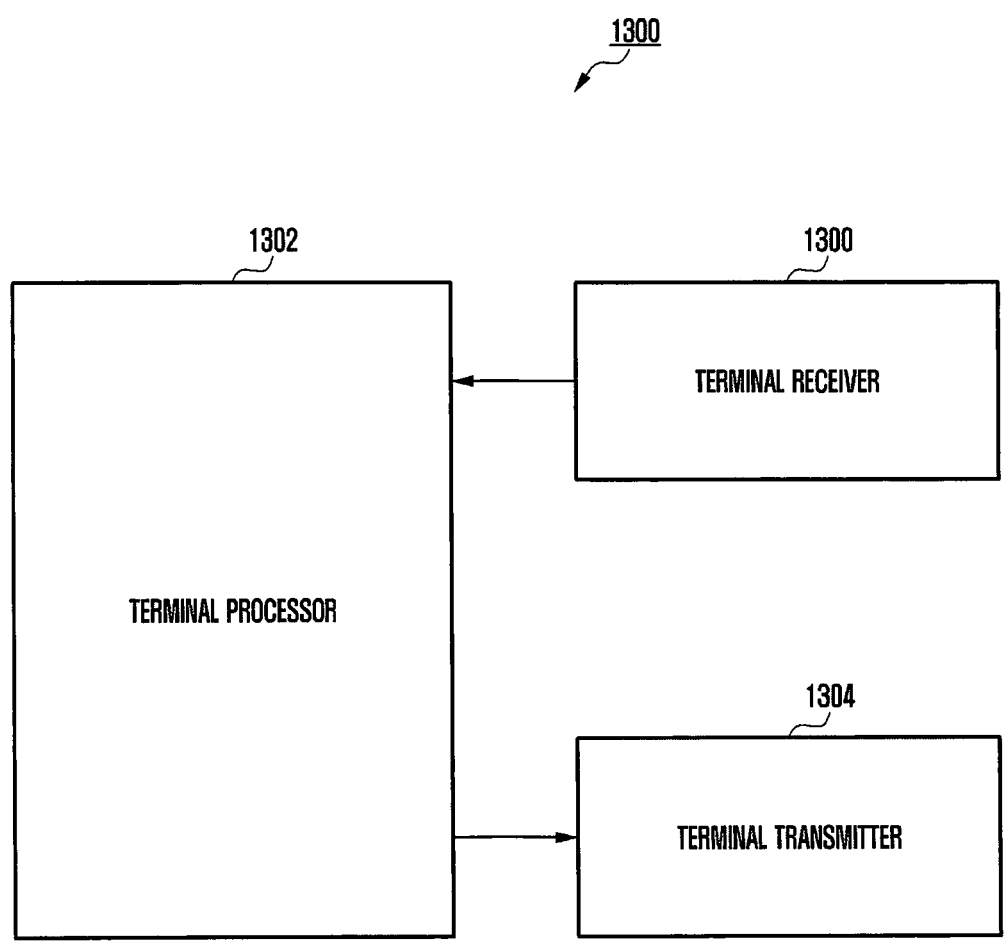
FIG. 13 is a block diagram of the structure of a terminal according to embodiments of the disclosure.
Figure 14:
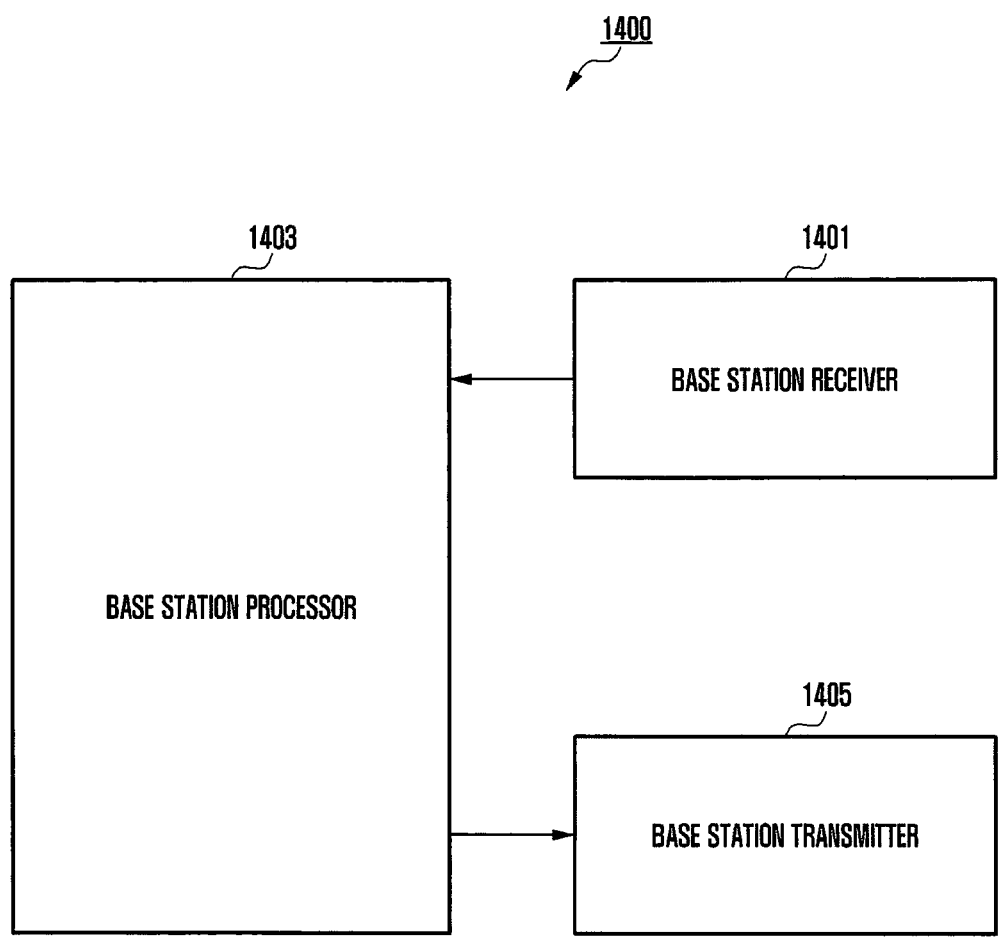
FIG. 14 is a block diagram of the structure of a base station according to embodiments of the disclosure.

In order to implement the embodiments of the disclosure, the transmitters, the receivers, the processors of a terminal and a base station are illustrated in FIG. 13 and FIG. 14, respectively. The transmission/reception method of a terminal and a base station according to the disclosure, which transmits the result of reception of a first signal to the base station and receives the result of reception of a first signal from the terminal, is illustrated. In order to implement the same, the receivers, processors, and transmitters of the base station and the terminal need to operate according to embodiments. FIG. 13 is a block diagram of an internal structure 1300 of a terminal according to an embodiment of the disclosure. As illustrated in FIG. 13, the terminal of the disclosure may include a terminal receiver 1300, a terminal transmitter 1304, and a terminal processor 1302. The terminal receiver 1300 and the terminal transmitter 1304 are commonly called a transceiver in the embodiment of the disclosure. The transceiver may perform transmission or reception of a signal with a base station. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver outputs, to the terminal processor 1302, a signal received via a wireless channel, and transmits a signal output from the terminal processor 1302 via a wireless channel. The terminal processor 1302 may control a series of processes such that the terminal operates according to the above-described embodiments of the disclosure. For example, the terminal receiver 1300 may receive a data signal including a control signal, and the terminal processor 1302 may determine the result of reception of a data signal. Subsequently, if the terminal needs to transmit, to the base station, a first signal reception result including the data reception result at the timing, the terminal transmitter 1304 may transmit the first signal reception result to the base station at the timing determined by the processor.

FIG. 14 is a block diagram of an internal structure 1400 of a base station according to an embodiment of the disclosure. As illustrated in FIG. 14, the base station of the disclosure may include a base station receiver 1401, a base station transmitter 1405, and a base station processor 1403. The base station receiver 1401 and the base station transmitter 1405 are commonly called a transceiver in the embodiments of the disclosure. The transceiver may perform transmission or reception of a signal with a terminal. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver outputs, to the base station processor 1403, a signal received via a wireless channel, and transmits a signal output from the base station processor 1403 via a wireless channel.

The base station processor 1403 may control a series of processes such that the base station operates according to the above-described embodiments of the disclosure. For example, the base station receiver 1401 receives a data signal including a control signal transmitted by a terminal, and the base station processor 1403 determines the result of reception of the control signal and the data signal transmitted from the terminal. Subsequently, when the base station needs to receive again, from the terminal, a first signal reception result including the control signal reception result at the timing, the base station determines the timing determined by the processor, resources, and first signal reception results that need to be retransmitted, and transmits control information, which configures the terminal to report a first signal reception result, to the terminal using the base station transmitter 1405.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, the base station and terminal may operate according to a combination of some of method 1, method 2, and method 3 of the disclosure. Also, although the embodiments have been described with reference to an LTE/LTE-A system, other modifications of the embodiments based on the technical idea of the embodiments may be applied to other systems, such as a 5G or NR system, or the like.

The invention claimed is:

1. A method performed by a terminal in a wireless communication system, the method comprising:
   receiving, from a base station on a physical downlink control channel (PDCCH), downlink control information (DCI) scheduling downlink data, wherein the DCI includes first information on a physical uplink control channel (PUCCH) resource of an unlicensed band associated with an uplink transmission for the downlink data, second information on at least one additional PUCCH resource of the unlicensed band for the downlink data in addition to the PUCCH resource, and information on a time offset between the PUCCH resource and the at least one additional PUCCH resource;
   receiving, from the base station, the downlink data based on the DCI;
   identifying an available PUCCH resource among the PUCCH resource and the at least one additional PUCCH resource based on the time offset; and
   transmitting, to the base station, a response for the downlink data based on the identified available PUCCH resource on the unlicensed band.

2. The method of claim 1, wherein the DCI further includes at least one of an acknowledgement (ACK) request field, a downlink assignment index (DAI) field, or an ACK window field, for the response, and
   wherein the response includes information on a result of reception for one or more hybrid automatic repeat request (HARQ) processes identified by the DCI.

3. The method of claim 1, wherein the response is transmitted based on a result of a channel access procedure for the unlicensed band.

4. The method of claim 1, wherein a number of the at least one additional PUCCH resource is identified based on the DCI, a higher layer signaling, system information, or a group common PDCCH, and
   wherein the DCI configures a starting symbol, an ending symbol, and a transmission interval length for each of the PUCCH resource and the at least one additional PUCCH resource.

5. A terminal in a wireless communication system, the terminal comprising:
   a transceiver configured to transmit or receive a signal; and
   a controller coupled with the transceiver and configured to:
      receive, from a base station on a physical downlink control channel (PDCCH), downlink control information (DCI) scheduling downlink data, wherein the DCI includes first information on a physical uplink control channel (PUCCH) resource of an unlicensed band associated with an uplink transmission for the downlink data, second information on at least one additional PUCCH resource of the unlicensed band for the downlink data in addition to the PUCCH resource, and information on a time offset between the PUCCH resource and the at least one additional PUCCH resource,
      receive, from the base station, the downlink data based on the DCI,
      identify an available PUCCH resource among the PUCCH resource and the at least one additional PUCCH resource based on the time offset, and
      transmit, to the base station, a response for the downlink data based on the identified available PUCCH resource on the unlicensed band.

6. The terminal of claim 5, wherein the DCI further includes at least one of an acknowledgement (ACK) request field, a downlink assignment index (DAI) field, or an ACK window field, for the response,
   wherein the response includes information on a result of reception for one or more hybrid automatic repeat request (HARQ) processes identified by the DCI.

7. The terminal of claim 5, wherein the response is transmitted based on a result of a channel access procedure for the unlicensed band.

8. The terminal of claim 5, wherein a number of the at least one additional PUCCH resource is identified based on the DCI, a higher layer signaling, system information, or a group common PDCCH, and wherein the DCI configures a starting symbol, an ending symbol, and a transmission interval length for each of the PUCCH resource and the at least one additional PUCCH resource.

9. A method performed by a base station in a wireless communication system, the method comprising:
transmitting, to a terminal on a physical downlink control channel (PDCCH), downlink control information (DCI) scheduling a downlink data, wherein the DCI includes first information on a physical uplink control channel (PUCCH) resource of an unlicensed band associated with an uplink transmission for the downlink data, second information on at least one additional PUCCH resource of the unlicensed band for the downlink data in addition to the PUCCH resource, and information on a time offset between the PUCCH resource and the at least one additional PUCCH resource;
transmitting, to the terminal, the downlink data based on the DCI; and
receiving, from the terminal, a response for the downlink data based on an available PUCCH resource on the unlicensed band,
wherein the available PUCCH resource is identified among the PUCCH resource and the at least one additional PUCCH resource based on the time offset.

10. The method of claim 9, wherein the DCI further includes at least one of an acknowledgement (ACK) request field, a downlink assignment index (DAI) field, or an ACK window field, for the response,
wherein the response includes information on a result of reception for one or more hybrid automatic repeat request (HARQ) processes identified by the DCI, and
wherein the response is received based on a channel access procedure for the unlicensed band.

11. The method of claim 9, wherein a number of the at least one additional PUCCH resource is identified based on the DCI, a higher layer signaling, system information, or a group common PDCCH, and
wherein the DCI configures a starting symbol, an ending symbol, and a transmission interval length for each of the PUCCH resource and the at least one additional PUCCH resource.

12. A base station in a wireless communication system, the base station comprising:
a transceiver configured to transmit or receive a signal; and
a controller coupled with the transceiver and configured to:
transmit, to a terminal on a physical downlink control channel (PDCCH), downlink control information (DCI) scheduling a downlink data, wherein the DCI includes first information on a physical uplink control channel (PUCCH) resource of an unlicensed band associated with an uplink transmission for the downlink data, second information on at least one additional PUCCH resource of the unlicensed band for the downlink data in addition to the PUCCH resource, and information on a time offset between the PUCCH resource and the at least one additional PUCCH resource,
transmit, to the terminal, the downlink data based on the DCI, and
receive, from the terminal, a response for the downlink data based on an available PUCCH resource on the unlicensed band,
wherein the available PUCCH resource is identified among the PUCCH resource and the at least one additional PUCCH resource based on the time offset.

13. The base station of claim 12, wherein the DCI further includes at least one of an acknowledgement (ACK) request field, a downlink assignment index (DAI) field, or an ACK window field for the response, and
wherein the response includes information on a result of reception for one or more hybrid automatic repeat request (HARQ) processes identified by the DCI.

14. The base station of claim 12, wherein the response is received based on a channel access procedure for the unlicensed band.

15. The base station of claim 12, wherein a number of the at least one additional PUCCH resource is identified based on the DCI, a higher layer signaling, system information, or a group common PDCCH, and
wherein the DCI configures a starting symbol, an ending symbol, and a transmission interval length for each of the PUCCH resource and the at least one additional PUCCH resource.

* * * * *